United States Patent
Singh (10) Patent No.: US 7,953,923 B2
(45) Date of Patent: *May 31, 2011

(54) DOUBLE DENSITY CONTENT ADDRESSABLE MEMORY (CAM) LOOKUP SCHEME

(75) Inventor: Ram Dular Singh, San Jose, CA (US)

(73) Assignee: Foundry Networks, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/639,762

(22) Filed: Dec. 16, 2009

(65) Prior Publication Data

US 2010/0161894 A1   Jun. 24, 2010

Related U.S. Application Data

(63) Continuation of application No. 11/118,697, filed on Apr. 28, 2005, now Pat. No. 7,657,703.

(60) Provisional application No. 60/623,435, filed on Oct. 29, 2004.

(51) Int. Cl.
*G06F 13/00* (2006.01)

(52) U.S. Cl. ......................................... 711/108; 711/113

(58) Field of Classification Search .................. 711/108, 711/113; 365/49.1
See application file for complete search history.

(56) References Cited

U.S. PATENT DOCUMENTS

| | | | |
|---|---|---|---|
| 3,866,175 A | 2/1975 | Seifert, Jr. et al. | |
| 4,325,119 A | 4/1982 | Grandmaison et al. | |
| 4,348,725 A | 9/1982 | Farrell et al. | |
| 4,628,480 A | 12/1986 | Floyd | |
| 4,667,323 A | 5/1987 | Engdahl et al. | |
| 4,683,564 A | 7/1987 | Young et al. | |
| 4,698,748 A | 10/1987 | Juzswik et al. | |

(Continued)

FOREIGN PATENT DOCUMENTS

EP    1380127 A2    1/2004

(Continued)

OTHER PUBLICATIONS

Advisory Action for U.S. Appl. No. 11/831,950, mailed on Mar. 4, 2010, 4 pages.

(Continued)

*Primary Examiner* — Vu A Le
(74) *Attorney, Agent, or Firm* — Kilpatrick Townsend & Stockton LLP (57) ABSTRACT

The number of content addressable memory (CAM) lookups is reduced from two to one. Each side (left and right sides) of a CAM is programmed with network addresses, such as IP addresses, based on certain bits of the network addresses. These bits of the network addresses (which represent packet routes) are examined and used to determine whether the particular network address is to be placed on the left or right sides of the CAM. The grouping of certain network addresses either on the left or right sides of the CAM can be performed by examining an individual bit of each network address, by performing an exclusive OR (XOR) operation on a plurality of bits of each network address, and/or by searching for bit patterns of the network address in a decision table. Network addresses that cannot be readily assigned to a particular side of the CAM using these grouping techniques are programmed into both sides of the CAM. During packet routing, techniques similar to the grouping techniques that populated the CAM are used to determine which of the two sides of the CAM is to be searched.

25 Claims, 3 Drawing Sheets

U.S. PATENT DOCUMENTS

| | | | |
|---|---|---|---|
| 4,723,243 A | 2/1988 | Joshi et al. |
| 4,754,482 A | 6/1988 | Weiss |
| 4,791,629 A | 12/1988 | Burns et al. |
| 4,794,629 A | 12/1988 | Pastyr et al. |
| 4,807,280 A | 2/1989 | Posner et al. |
| 4,876,681 A | 10/1989 | Hagiwara et al. |
| 4,896,277 A | 1/1990 | Vercellotti et al. |
| 4,985,889 A | 1/1991 | Frankish et al. |
| 5,101,404 A | 3/1992 | Kunimoto et al. |
| 5,136,584 A | 8/1992 | Hedlund |
| 5,195,181 A | 3/1993 | Bryant et al. |
| 5,208,856 A | 5/1993 | Leduc et al. |
| 5,224,108 A | 6/1993 | McDysan et al. |
| 5,231,633 A | 7/1993 | Hluchyj et al. |
| 5,280,582 A | 1/1994 | Yang et al. |
| 5,282,196 A | 1/1994 | Clebowicz |
| 5,287,477 A | 2/1994 | Johnson et al. |
| 5,299,190 A | 3/1994 | LaMaire et al. |
| 5,299,195 A | 3/1994 | Shah |
| 5,301,192 A | 4/1994 | Henrion |
| 5,307,345 A | 4/1994 | Lozowick et al. |
| 5,323,386 A | 6/1994 | Wiher et al. |
| 5,365,512 A | 11/1994 | Combs et al. |
| 5,377,189 A | 12/1994 | Clark |
| 5,390,173 A | 2/1995 | Spinney et al. |
| 5,392,279 A | 2/1995 | Taniguchi |
| 5,406,643 A | 4/1995 | Burke et al. |
| 5,408,469 A | 4/1995 | Opher et al. |
| 5,430,442 A | 7/1995 | Kaiser et al. |
| 5,436,893 A | 7/1995 | Barnett |
| 5,461,615 A | 10/1995 | Henrion |
| 5,490,258 A | 2/1996 | Fenner |
| 5,506,840 A | 4/1996 | Pauwels et al. |
| 5,506,841 A | 4/1996 | Sandquist |
| 5,521,923 A | 5/1996 | Willmann et al. |
| 5,546,385 A | 8/1996 | Caspi et al. |
| 5,550,816 A | 8/1996 | Hardwick et al. |
| 5,563,948 A | 10/1996 | Diehl et al. |
| 5,566,170 A | 10/1996 | Bakke et al. |
| 5,598,410 A | 1/1997 | Stone |
| 5,600,795 A | 2/1997 | Du |
| 5,619,497 A | 4/1997 | Gallagher et al. |
| 5,640,504 A | 6/1997 | Johnson, Jr. |
| 5,646,878 A | 7/1997 | Samra |
| 5,663,952 A | 9/1997 | Gentry, Jr. |
| 5,663,959 A | 9/1997 | Nakagawa |
| 5,666,353 A | 9/1997 | Klausmeier et al. |
| 5,721,819 A | 2/1998 | Galles et al. |
| 5,732,080 A | 3/1998 | Ferguson et al. |
| 5,734,826 A | 3/1998 | Olnowich et al. |
| 5,740,176 A | 4/1998 | Gupta et al. |
| 5,745,708 A | 4/1998 | Weppler et al. |
| 5,751,710 A | 5/1998 | Crowther et al. |
| 5,802,287 A | 9/1998 | Rostoker et al. |
| 5,815,146 A | 9/1998 | Youden et al. |
| 5,818,816 A | 10/1998 | Chikazawa et al. |
| 5,835,496 A | 11/1998 | Yeung et al. |
| 5,838,684 A | 11/1998 | Wicki et al. |
| 5,862,350 A | 1/1999 | Coulson |
| 5,864,555 A | 1/1999 | Mathur et al. |
| 5,867,675 A | 2/1999 | Lomelino et al. |
| 5,870,538 A | 2/1999 | Manning et al. |
| 5,872,769 A | 2/1999 | Caldara et al. |
| 5,872,783 A | 2/1999 | Chin |
| 5,875,200 A | 2/1999 | Glover et al. |
| 5,896,380 A | 4/1999 | Brown et al. |
| 5,907,566 A | 5/1999 | Benson et al. |
| 5,907,660 A | 5/1999 | Inoue et al. |
| 5,909,686 A | 6/1999 | Muller et al. |
| 5,915,094 A | 6/1999 | Kouloheris et al. |
| 5,920,566 A | 7/1999 | Hendel et al. |
| 5,920,886 A | 7/1999 | Feldmeier |
| 5,936,939 A | 8/1999 | Des Jardins et al. |
| 5,936,966 A | 8/1999 | Ogawa et al. |
| 5,956,347 A | 9/1999 | Slater |
| 5,999,528 A | 12/1999 | Chow et al. |
| 6,000,016 A | 12/1999 | Curtis et al. |
| 6,016,310 A | 1/2000 | Muller et al. |
| 6,023,471 A | 2/2000 | Haddock et al. |
| 6,031,843 A | 2/2000 | Swanbery et al. |
| 6,035,414 A | 3/2000 | Okazawa et al. |
| 6,038,288 A | 3/2000 | Thomas et al. |
| 6,067,298 A | 5/2000 | Shinohara |
| 6,067,606 A | 5/2000 | Holscher et al. |
| 6,076,115 A | 6/2000 | Sambamurthy et al. |
| 6,081,522 A | 6/2000 | Hendel et al. |
| 6,088,356 A | 7/2000 | Hendel et al. |
| 6,094,434 A | 7/2000 | Kotzur et al. |
| 6,104,696 A | 8/2000 | Kadambi et al. |
| 6,104,700 A | 8/2000 | Haddock et al. |
| 6,104,969 A | 8/2000 | Beeks |
| 6,108,306 A | 8/2000 | Kalkunte et al. |
| 6,118,787 A | 9/2000 | Kalkunte et al. |
| 6,125,417 A | 9/2000 | Bailis et al. |
| 6,128,666 A | 10/2000 | Muller et al. |
| 6,144,668 A | 11/2000 | Bass et al. |
| 6,147,996 A | 11/2000 | Laor et al. |
| 6,151,301 A | 11/2000 | Holden |
| 6,151,497 A | 11/2000 | Yee et al. |
| 6,154,446 A | 11/2000 | Kadambi et al. |
| 6,157,643 A | 12/2000 | Ma |
| 6,160,809 A | 12/2000 | Adiletta et al. |
| 6,160,812 A | 12/2000 | Bauman et al. |
| 6,172,990 B1 | 1/2001 | Deb et al. |
| 6,178,520 B1 | 1/2001 | DeKoning et al. |
| 6,181,699 B1 | 1/2001 | Crinion et al. |
| 6,185,222 B1 | 2/2001 | Hughes |
| 6,195,335 B1 | 2/2001 | Calvignac et al. |
| 6,201,492 B1 | 3/2001 | Amar et al. |
| 6,222,845 B1 | 4/2001 | Shue et al. |
| 6,243,667 B1 | 6/2001 | Kerr et al. |
| 6,249,528 B1 | 6/2001 | Kothary |
| 6,263,374 B1 | 7/2001 | Olnowich et al. |
| 6,272,144 B1 | 8/2001 | Berenbaum et al. |
| 6,304,903 B1 | 10/2001 | Ward |
| 6,320,859 B1 | 11/2001 | Momirov |
| 6,333,929 B1 | 12/2001 | Drottar et al. |
| 6,335,932 B2 | 1/2002 | Kadambi et al. |
| 6,335,935 B2 | 1/2002 | Kadambi et al. |
| 6,343,072 B1 | 1/2002 | Bechtolsheim et al. |
| 6,351,143 B1 | 2/2002 | Guccione et al. |
| 6,356,550 B1 | 3/2002 | Williams |
| 6,356,942 B1 | 3/2002 | Bengtsson et al. |
| 6,363,077 B1 | 3/2002 | Wong et al. |
| 6,366,557 B1 | 4/2002 | Hunter |
| 6,369,855 B1 | 4/2002 | Chauvel et al. |
| 6,421,352 B1 | 7/2002 | Manaka et al. |
| 6,424,658 B1 | 7/2002 | Mathur |
| 6,424,659 B2 | 7/2002 | Viswanadham et al. |
| 6,427,185 B1 | 7/2002 | Ryals et al. |
| 6,430,190 B1 | 8/2002 | Essbaum et al. |
| 6,457,175 B1 | 9/2002 | Lerche |
| 6,459,705 B1 | 10/2002 | Cheng |
| 6,460,088 B1 | 10/2002 | Merchant |
| 6,463,063 B1 | 10/2002 | Bianchini, Jr. et al. |
| 6,466,608 B1 | 10/2002 | Hong et al. |
| 6,470,436 B1 | 10/2002 | Croft et al. |
| 6,473,428 B1 | 10/2002 | Nichols et al. |
| 6,473,433 B1 | 10/2002 | Bianchini, Jr. et al. |
| 6,477,174 B1 | 11/2002 | Dooley et al. |
| 6,480,477 B1 | 11/2002 | Treadaway et al. |
| 6,490,280 B1 | 12/2002 | Leung |
| 6,493,347 B2 | 12/2002 | Sindhu et al. |
| 6,496,502 B1 | 12/2002 | Fite, Jr. et al. |
| 6,505,281 B1 | 1/2003 | Sherry |
| 6,510,138 B1 | 1/2003 | Pannell |
| 6,522,656 B1 | 2/2003 | Gridley |
| 6,532,229 B1 | 3/2003 | Johnson et al. |
| 6,532,234 B1 | 3/2003 | Yoshikawa et al. |
| 6,535,504 B1 | 3/2003 | Johnson et al. |
| 6,549,519 B1 | 4/2003 | Daines et al. |
| 6,553,370 B1 | 4/2003 | Andreev et al. |
| 6,556,208 B1 | 4/2003 | Congdon et al. |
| 6,567,404 B1 | 5/2003 | Wilford |
| 6,577,631 B1 | 6/2003 | Keenan et al. |
| 6,587,432 B1 | 7/2003 | Putzolu et al. |
| 6,591,302 B2 | 7/2003 | Boucher et al. |

| | | | | | | |
|---|---|---|---|---|---|---|
| 6,601,186 B1 | 7/2003 | Fox et al. | | 7,005,812 B2 | 2/2006 | Mitchell |
| 6,606,300 B1 | 8/2003 | Blanc et al. | | 7,009,968 B2 | 3/2006 | Ambe et al. |
| 6,628,650 B1 | 9/2003 | Saite et al. | | 7,012,919 B1 | 3/2006 | So et al. |
| 6,633,580 B1 | 10/2003 | Torudbakken et al. | | 7,082,133 B1 | 7/2006 | Lor et al. |
| 6,636,483 B1 | 10/2003 | Pannell | | 7,103,041 B1 | 9/2006 | Speiser et al. |
| 6,643,269 B1 | 11/2003 | Fan et al. | | 7,120,744 B2 * | 10/2006 | Klein ............ 711/118 |
| 6,654,342 B1 | 11/2003 | Dittia et al. | | 7,126,956 B2 | 10/2006 | Scholten |
| 6,654,346 B1 | 11/2003 | Mahalingaiah et al. | | 7,176,911 B1 | 2/2007 | Kidono et al. |
| 6,654,370 B1 | 11/2003 | Quirke et al. | | 7,185,141 B1 | 2/2007 | James et al. |
| 6,654,373 B1 | 11/2003 | Maher, III et al. | | 7,185,266 B2 | 2/2007 | Blightman et al. |
| 6,658,002 B1 | 12/2003 | Ross et al. | | 7,187,687 B1 | 3/2007 | Davis et al. |
| 6,661,791 B1 | 12/2003 | Brown | | 7,190,696 B1 | 3/2007 | Manur et al. |
| 6,671,275 B1 | 12/2003 | Wong et al. | | 7,191,277 B2 | 3/2007 | Broyles |
| 6,678,248 B1 | 1/2004 | Haddock et al. | | 7,203,194 B2 | 4/2007 | Chang et al. |
| 6,681,332 B1 | 1/2004 | Byrne et al. | | 7,206,283 B2 | 4/2007 | Chang et al. |
| 6,683,872 B1 | 1/2004 | Saito | | 7,212,536 B2 | 5/2007 | Mackiewich et al. |
| 6,687,217 B1 | 2/2004 | Chow et al. | | 7,218,637 B1 | 5/2007 | Best et al. |
| 6,687,247 B1 | 2/2004 | Wilford et al. | | 7,219,293 B2 | 5/2007 | Tsai et al. |
| 6,691,202 B2 | 2/2004 | Vasquez et al. | | 7,228,509 B1 | 6/2007 | Dada et al. |
| 6,696,917 B1 | 2/2004 | Heitner et al. | | 7,236,490 B2 | 6/2007 | Chang et al. |
| 6,697,359 B1 | 2/2004 | George | | 7,237,058 B2 | 6/2007 | Srinivasan |
| 6,697,368 B2 | 2/2004 | Chang et al. | | 7,266,117 B1 | 9/2007 | Davis |
| 6,700,894 B1 | 3/2004 | Shung | | 7,277,425 B1 | 10/2007 | Sikdar |
| 6,708,000 B1 | 3/2004 | Nishi et al. | | 7,283,547 B1 | 10/2007 | Hook et al. |
| 6,721,229 B1 | 4/2004 | Cole | | 7,286,534 B2 | 10/2007 | Kloth |
| 6,721,268 B1 | 4/2004 | Ohira et al. | | 7,324,509 B2 | 1/2008 | Ni |
| 6,721,313 B1 | 4/2004 | Van Duyne | | 7,355,970 B2 | 4/2008 | Lor |
| 6,721,338 B1 | 4/2004 | Sato | | 7,356,030 B2 | 4/2008 | Chang et al. |
| 6,731,875 B1 | 5/2004 | Kartalopoulos | | 7,391,769 B2 | 6/2008 | Rajkumar et al. |
| 6,735,218 B2 | 5/2004 | Chang et al. | | 7,428,693 B2 | 9/2008 | Obuchi et al. |
| 6,745,277 B1 | 6/2004 | Lee et al. | | 7,468,975 B1 | 12/2008 | Davis |
| 6,747,971 B1 | 6/2004 | Hughes et al. | | 7,512,127 B2 | 3/2009 | Chang et al. |
| 6,751,224 B1 | 6/2004 | Parruck et al. | | 7,558,193 B2 | 7/2009 | Bradbury et al. |
| 6,754,881 B1 | 6/2004 | Kuhlmann et al. | | 7,561,590 B1 | 7/2009 | Walsh |
| 6,765,866 B1 | 7/2004 | Wyatt | | 7,596,139 B2 | 9/2009 | Patel et al. |
| 6,775,706 B1 | 8/2004 | Fukumoto et al. | | 7,613,991 B1 | 11/2009 | Bain |
| 6,778,546 B1 | 8/2004 | Epps et al. | | 7,636,369 B2 | 12/2009 | Wong |
| 6,781,990 B1 | 8/2004 | Puri et al. | | 7,649,885 B1 | 1/2010 | Davis et al. |
| 6,785,290 B1 | 8/2004 | Fujisawa et al. | | 7,657,703 B1 | 2/2010 | Singh |
| 6,788,697 B1 | 9/2004 | Aweya et al. | | 7,738,450 B1 | 6/2010 | Davis |
| 6,792,484 B1 | 9/2004 | Hook | | 7,817,659 B2 | 10/2010 | Wong |
| 6,792,502 B1 | 9/2004 | Pandya et al. | | 7,830,884 B2 | 11/2010 | Davis |
| 6,795,846 B1 * | 9/2004 | Merriam ............ 709/203 | | 2001/0001879 A1 | 5/2001 | Kubik et al. |
| 6,798,740 B1 | 9/2004 | Senevirathne et al. | | 2001/0007560 A1 | 7/2001 | Masuda et al. |
| 6,804,220 B2 | 10/2004 | Odenwalder et al. | | 2001/0026551 A1 | 10/2001 | Horlin |
| 6,804,731 B1 | 10/2004 | Chang et al. | | 2001/0048785 A1 | 12/2001 | Steinberg |
| 6,807,179 B1 | 10/2004 | Kanuri et al. | | 2001/0053150 A1 | 12/2001 | Clear et al. |
| 6,807,363 B1 | 10/2004 | Abiko et al. | | 2002/0001307 A1 | 1/2002 | Nguyen et al. |
| 6,810,038 B1 | 10/2004 | Isoyama et al. | | 2002/0012585 A1 | 1/2002 | Kalkunte et al. |
| 6,810,046 B2 | 10/2004 | Abbas et al. | | 2002/0040417 A1 | 4/2002 | Winograd et al. |
| 6,813,243 B1 | 11/2004 | Epps et al. | | 2002/0054594 A1 | 5/2002 | Hoof et al. |
| 6,813,266 B1 | 11/2004 | Chiang et al. | | 2002/0054595 A1 | 5/2002 | Ambe et al. |
| 6,816,467 B1 | 11/2004 | Muller et al. | | 2002/0069294 A1 | 6/2002 | Herkersdorf et al. |
| 6,831,923 B1 | 12/2004 | Laor et al. | | 2002/0073073 A1 | 6/2002 | Cheng |
| 6,831,932 B1 | 12/2004 | Boyle et al. | | 2002/0085499 A1 | 7/2002 | Toyoyama et al. |
| 6,836,808 B2 | 12/2004 | Bunce et al. | | 2002/0087788 A1 | 7/2002 | Morris |
| 6,839,346 B1 | 1/2005 | Kametani | | 2002/0089937 A1 | 7/2002 | Venkatachary et al. |
| 6,842,422 B1 | 1/2005 | Bianchini, Jr. | | 2002/0091844 A1 | 7/2002 | Craft et al. |
| 6,854,117 B1 | 2/2005 | Roberts | | 2002/0091884 A1 | 7/2002 | Chang et al. |
| 6,856,600 B1 | 2/2005 | Russell et al. | | 2002/0126672 A1 | 9/2002 | Chow et al. |
| 6,859,438 B2 | 2/2005 | Haddock et al. | | 2002/0131437 A1 | 9/2002 | Tagore-Brage |
| 6,865,153 B1 | 3/2005 | Hill et al. | | 2002/0141403 A1 | 10/2002 | Akahane et al. |
| 6,901,072 B1 | 5/2005 | Wong | | 2002/0146013 A1 | 10/2002 | Karlsson et al. |
| 6,906,936 B1 | 6/2005 | James et al. | | 2002/0161967 A1 | 10/2002 | Kirihata et al. |
| 6,912,637 B1 | 6/2005 | Herbst | | 2002/0169786 A1 | 11/2002 | Richek |
| 6,920,154 B1 | 7/2005 | Achler | | 2002/0191605 A1 | 12/2002 | Lunteren et al. |
| 6,925,516 B2 | 8/2005 | Struhsaker et al. | | 2003/0009466 A1 | 1/2003 | Ta et al. |
| 6,934,305 B1 | 8/2005 | Duschatko et al. | | 2003/0012198 A1 | 1/2003 | Kaganoi et al. |
| 6,937,606 B2 | 8/2005 | Basso et al. | | 2003/0033435 A1 | 2/2003 | Hanner |
| 6,946,948 B2 | 9/2005 | McCormack et al. | | 2003/0043800 A1 | 3/2003 | Sonksen et al. |
| 6,957,258 B2 | 10/2005 | Maher, III et al. | | 2003/0043848 A1 | 3/2003 | Sonksen |
| 6,959,007 B1 | 10/2005 | Vogel et al. | | 2003/0048785 A1 | 3/2003 | Calvignac et al. |
| 6,973,092 B1 | 12/2005 | Zhou et al. | | 2003/0061459 A1 | 3/2003 | Aboulenein et al. |
| 6,978,309 B1 | 12/2005 | Dorbolo | | 2003/0074657 A1 | 4/2003 | Bramley, Jr. |
| 6,980,552 B1 | 12/2005 | Belz et al. | | 2003/0081608 A1 | 5/2003 | Barri et al. |
| 6,982,974 B1 | 1/2006 | Saleh et al. | | 2003/0095548 A1 | 5/2003 | Yamano |
| 6,990,102 B1 | 1/2006 | Kaniz et al. | | 2003/0103499 A1 | 6/2003 | Davis et al. |
| 6,993,032 B1 | 1/2006 | Dammann et al. | | 2003/0103500 A1 | 6/2003 | Menon et al. |
| 6,996,663 B1 | 2/2006 | Marsteiner | | 2003/0108052 A1 | 6/2003 | Inoue et al. |

| | | |
|---|---|---|
| 2003/0110180 A1 | 6/2003 | Calvignac et al. |
| 2003/0115403 A1 | 6/2003 | Bouchard et al. |
| 2003/0120861 A1 | 6/2003 | Calle et al. |
| 2003/0128668 A1 | 7/2003 | Yavatkar et al. |
| 2003/0137978 A1 | 7/2003 | Kanetake |
| 2003/0152084 A1 | 8/2003 | Lee et al. |
| 2003/0152096 A1 | 8/2003 | Chapman |
| 2003/0156586 A1 | 8/2003 | Lee et al. |
| 2003/0159086 A1 | 8/2003 | Arndt |
| 2003/0165160 A1 | 9/2003 | Minami et al. |
| 2003/0169470 A1 | 9/2003 | Alagar et al. |
| 2003/0174719 A1 | 9/2003 | Sampath et al. |
| 2003/0177221 A1 | 9/2003 | Ould-Brahim et al. |
| 2003/0198182 A1 | 10/2003 | Pegrum et al. |
| 2003/0200343 A1 | 10/2003 | Greenblat et al. |
| 2003/0214956 A1 | 11/2003 | Navada et al. |
| 2003/0215029 A1 | 11/2003 | Limberg |
| 2003/0223424 A1 | 12/2003 | Anderson et al. |
| 2003/0223466 A1 | 12/2003 | Noronha, Jr. et al. |
| 2003/0227943 A1 | 12/2003 | Hallman et al. |
| 2004/0022263 A1 | 2/2004 | Zhao et al. |
| 2004/0028060 A1 | 2/2004 | Kang |
| 2004/0054867 A1 | 3/2004 | Stravers et al. |
| 2004/0062245 A1 | 4/2004 | Sharp et al. |
| 2004/0062246 A1 | 4/2004 | Boucher et al. |
| 2004/0088469 A1 | 5/2004 | Levy |
| 2004/0128434 A1 | 7/2004 | Khanna et al. |
| 2004/0141504 A1 | 7/2004 | Blanc et al. |
| 2004/0190547 A1 | 9/2004 | Gordy et al. |
| 2004/0208177 A1 | 10/2004 | Ogawa |
| 2004/0208181 A1 | 10/2004 | Clayton et al. |
| 2004/0223502 A1 | 11/2004 | Wybenga et al. |
| 2004/0264380 A1 | 12/2004 | Kalkunte et al. |
| 2005/0010630 A1 | 1/2005 | Doering et al. |
| 2005/0010849 A1 | 1/2005 | Ryle et al. |
| 2005/0041684 A1 | 2/2005 | Reynolds et al. |
| 2005/0097432 A1 | 5/2005 | Obuchi et al. |
| 2005/0132132 A1 | 6/2005 | Rosenbluth et al. |
| 2005/0138276 A1 | 6/2005 | Navada et al. |
| 2005/0144369 A1 | 6/2005 | Jaspers |
| 2005/0152324 A1 | 7/2005 | Benveniste |
| 2005/0152335 A1 | 7/2005 | Lodha et al. |
| 2005/0185577 A1 | 8/2005 | Sakamoto et al. |
| 2005/0185652 A1 | 8/2005 | Iwamoto |
| 2005/0193316 A1 | 9/2005 | Chen |
| 2005/0201387 A1 | 9/2005 | Willis |
| 2005/0226236 A1 | 10/2005 | Klink |
| 2005/0246508 A1 | 11/2005 | Shaw |
| 2005/0249124 A1 | 11/2005 | Elie-Dit-Cosaque et al. |
| 2006/0031610 A1 | 2/2006 | Liav et al. |
| 2006/0034452 A1 | 2/2006 | Tonomura |
| 2006/0050690 A1 | 3/2006 | Epps et al. |
| 2006/0077891 A1 | 4/2006 | Smith et al. |
| 2006/0092829 A1 | 5/2006 | Brolin et al. |
| 2006/0092929 A1 | 5/2006 | Chun |
| 2006/0114876 A1 | 6/2006 | Kalkunte |
| 2006/0146374 A1 | 7/2006 | Ng et al. |
| 2006/0165089 A1 | 7/2006 | Klink |
| 2006/0209685 A1 | 9/2006 | Rahman et al. |
| 2006/0221841 A1 | 10/2006 | Lee et al. |
| 2006/0268680 A1 | 11/2006 | Roberts et al. |
| 2007/0038798 A1 | 2/2007 | Bouchard et al. |
| 2007/0088974 A1 | 4/2007 | Chandwani et al. |
| 2007/0127464 A1 | 6/2007 | Jain et al. |
| 2007/0179909 A1 | 8/2007 | Channasagara |
| 2007/0208876 A1 | 9/2007 | Davis |
| 2007/0258475 A1 | 11/2007 | Chinn et al. |
| 2007/0288690 A1 | 12/2007 | Wang et al. |
| 2008/0002707 A1 | 1/2008 | Davis |
| 2008/0031263 A1 | 2/2008 | Ervin et al. |
| 2008/0037544 A1 | 2/2008 | Yano et al. |
| 2008/0049742 A1 | 2/2008 | Bansal et al. |
| 2008/0069125 A1 | 3/2008 | Reed et al. |
| 2008/0092020 A1 | 4/2008 | Hasenplaugh et al. |
| 2008/0095169 A1 | 4/2008 | Chandra et al. |
| 2008/0181103 A1 | 7/2008 | Davies |
| 2008/0205407 A1 | 8/2008 | Chang et al. |
| 2008/0307288 A1 | 12/2008 | Ziesler et al. |
| 2009/0175178 A1 | 7/2009 | Yoon et al. |
| 2009/0279423 A1 | 11/2009 | Suresh et al. |
| 2009/0279440 A1 | 11/2009 | Wong et al. |
| 2009/0279441 A1 | 11/2009 | Wong et al. |
| 2009/0279541 A1 | 11/2009 | Wong et al. |
| 2009/0279542 A1 | 11/2009 | Wong et al. |
| 2009/0279546 A1 | 11/2009 | Davis |
| 2009/0279548 A1 | 11/2009 | Davis et al. |
| 2009/0279549 A1 | 11/2009 | Ramanathan et al. |
| 2009/0279558 A1 | 11/2009 | Davis et al. |
| 2009/0279559 A1 | 11/2009 | Wong et al. |
| 2009/0279561 A1 | 11/2009 | Chang et al. |
| 2009/0282148 A1 | 11/2009 | Wong et al. |
| 2009/0282322 A1 | 11/2009 | Wong et al. |
| 2009/0287952 A1 | 11/2009 | Patel et al. |
| 2009/0290499 A1 | 11/2009 | Patel et al. |
| 2010/0046521 A1 | 2/2010 | Wong |
| 2010/0061393 A1 | 3/2010 | Wong |
| 2010/0100671 A1 | 4/2010 | Singh |
| 2010/0135313 A1 | 6/2010 | Davis et al. |
| 2010/0246588 A1 | 9/2010 | Davis |

FOREIGN PATENT DOCUMENTS

| | | |
|---|---|---|
| JP | 2003/289359 A | 10/2003 |
| JP | 2004-537871 A | 12/2004 |
| WO | WO 01/84728 A1 | 11/2001 |
| WO | WO 02/041544 A3 | 5/2002 |

OTHER PUBLICATIONS

Non-Final Office Action for U.S. Appl. No. 11/779,714, mailed on Mar. 31, 2010, 26 pages.
Non-Final Office Action for U.S. Appl. No. 10/810,208, mailed on Feb. 5, 2010, 13 pages.
Final Office Action for U.S. Appl. No. 11/668,322, mailed on Feb. 24, 2010, 33 pages.
Final Office Action for U.S. Appl. No. 10/140,751, mailed on Mar. 25, 2010, 29 pages.
Advisory Action for U.S. Appl. No. 11/745,008, mailed on Apr. 21, 2010, 8 pages.
Notice of Allowance for U.S. Appl. No. 11/621,038, mailed on Apr. 28, 2010, 15 pages.
Non-Final Office Action for U.S. Appl. No. 12/400,594, mailed on May 14, 2010, 53 pages.
Non-Final Office Action for U.S. Appl. No. 12/372,390, mailed on Apr. 22, 2010, 46 pages.
Final Office Action for U.S. Appl. No. 11/953,742, mailed on Jun. 14, 2010, 21 pages.
Final Office Action for U.S. Appl. No. 11/953,743, mailed on Jul. 15, 2010, 21 pages.
Non-Final Office Action for U.S. Appl. No. 11/953,745, mailed on Jun. 14, 2010, 19 pages.
Final Office Action for U.S. Appl. No. 11/953,751, mailed on Jun. 25, 2010, 24 pages.
Notice of Allowance for U.S. Appl. No. 10/810,208, mailed on Jul. 15, 2010, 15 pages.
Non-Final Office Action for U.S. Appl. No. 11/668,322, mailed on Jun. 22, 2010, 16 pages.
Notice of Allowance for U.S. Appl. No. 11/854,486, mailed on Jul. 13, 2010, 12 pages.
Final Office Action for U.S. Appl. No. 12/198,697, mailed on Aug. 2, 2010, 55 pages.
Non-Final Office Action for U.S. Appl. No. 12/070,893, mailed on Jun. 10, 2010, 44 pages.
Advisory Action for U.S. Appl. No. 11/615,769, mailed on May 25, 2010, 3 pages.
Notice of Allowance for U.S. Appl. No. 11/615,769, mailed on Jul. 12, 2010, 14 pages.
U.S. Appl. No. 12/505,390, filed Jul. 17, 2009, Patel et al.
U.S. Appl. No. 12/639,749, filed Dec. 16, 2009, Singh.
U.S. Appl. No. 12/624,300, filed Nov. 23, 2009, Davis et al.
U.S. Appl. No. 12/608,985, filed Oct. 29, 2009, Wong.
U.S. Appl. No. 12/608,972, filed Oct. 29, 2009, Wong.
U.S. Appl. No. 12/417,913, filed Apr. 3, 2009, Patel et al.
U.S. Appl. No. 12/198,697, filed Aug. 26, 2008, Hsu et al.
U.S. Appl. No. 11/828,246, filed Jul. 25, 2007, Davis.

U.S. Appl. No. 11/724,965, filed Mar. 15, 2007, Chang et al.
U.S. Appl. No. 11/586,991, filed Oct. 25, 2006, Ramanathan et al.
U.S. Appl. No. 10/832,086, filed Apr. 26, 2004, Wong.
U.S. Appl. No. 10/141,223, filed May 7, 2002, Veerabadran et al.
U.S. Appl. No. 10/140,753, filed May 6, 2002, Davis et al.
U.S. Appl. No. 10/140,751, filed May 6, 2002, Davis.
10 Gigabit Ethernet—Technology Overview White Paper, Sep. 2001, 16 pages.
10 Gigabit Ethernet Alliance, Interconnection with Wide Area Networks, Version 1.0, Mar. 2002, 6 pages.
"IEEE Standard for Information Technology—Telecommunications and Information Exchange Between Systems—Local and Metropolitan Area Networks—Common Specifications—Part 3: Media Access Control (MAC) Bridges," ANSI/IEEE Standard 802.1D, 1998 Edition, 373 pages, IEEE.
Belhadj, et al., "Feasibility of a 100GE MAC," PowerPoint Presentation, IEEE Meeting Nov. 2006, Nov. 13-15, 2006, 18 pages.
Braun, et al., "Fast incremental CRC updates for IP over ATM networks," IEEE Workshop on High Performance Switching and Routing, 2001, 6 pages.
Degermark, M., et al., "Small Forwarding Tables for Fast Routing Lookups," ACM Computer Communications Review 27(4):Oct. 3-14, 1997.
Foundry Networks, "BigIron Architecture Technical Brief," Dec. 1998—Version 1.03, 14 pages.
Foundry Networks, "BigIron Architecture Technical Brief," Jul. 2001—Version 2.02, 16 pages.
Foundry Networks, "BigIron Architecture Technical Brief," May 1999—Version 2.0, 15 pages.
Foundry Networks, "BigIron Architecture Technical Brief," May 1999—Version 2.01, 15 pages.
Foundry Networks, "BigIron Architecture Technical Brief," Oct. 1998—Version 1.0, 15 pages.
Foundry Networks, "BigIron Architecture Technical Brief," Oct. 1998—Version 1.02, 15 pages.
Foundry Networks, "Foundry Networks," Next Generation Terabit System Architecture—The High Performance Revolution for 10 Gigabit Networks, Nov. 17, 2003, 27 pages.
Foundry Networks, "JetCore™ Based Chassis Systems—An Architecture Brief on NetIron, BigIron, and FastIron Systems," Jan. 17, 2003, 27 pages.
Gigabit Ethernet Alliance —"Accelerating the Standard for Speed," Copyright 1998, 19 pages.
Kichorowsky, R., et al., "Mindspeed.TM. Switch Fabric Offers the Most Comprehensive Solution for Multi-Protocol Networking Equipment," Apr. 30, 2001, 3 pages.
Matsumoto, C., et al., "Switch Fabrics Touted At Interconnects Conference," Aug. 21, 2000, URL= http://www.eetimes.com/story/OEG20000821S0011, accessed Aug. 12, 2002, 2 pages.
Mcauley, et al., "Fast Routing Table Lookup Using CAMs," Proceedings of INFOCOM, Mar.-Apr. 1993, pp. 1382-1391.
Mier Communications, Inc., "Lab Testing Summary Report—Product Category: Layer-3 Switches, Vendor Tested:, Product Tested: Foundry Networks, BigIron 4000," Report No. 231198, Oct. 1998, 6 pages.
Mier Communications, Inc.,"Lab Testing Summary Report—Product Category: Gigabit Backbone Switches, Vendor Tested: Foundry Networks, Product Tested: BigIron 4000," Report No. 210998, Sep. 1998, 6 pages.
Mindspeed—A Conexant Business, "17×17 3.2 Gbps Crosspoint Switch with Input Equalization—M21110," Feb. 1, 2001, 2 pages.
Mindspeed—A Conexant Business, "Switch Fabric Chipset—CX27300 iScale.TM.," Apr. 30, 2001, 2 pages.
Newton, Newton's Telecom Dictionary, CMP Books, Mar. 2004, 20th Ed., p. 617.
Satran et al., "Out of Order Incremental CRC Computation," IEEE Transactions on Computers, vol. 54, Issue 9 Sep. 2005), 11 pages.
Spurgeon, "Ethernet, The Definitive Guide," O'Reilly & Associates, Inc., Sebastapol, CA, Feb. 2000.
The Tolly Group, "Foundry Networks, Inc.—BigIron 4000, Layer 2 & Layer 3 Interoperability Evaluation," No. 199133, Oct. 1999, 4 pages.

The Tolly Group, "Foundry Networks, Inc.—BigIron 8000 Gigabit Ethernet Switching Router, Layer 2 & Layer 3 Performance Evaluation," No. 199111, May 1999, 4 pages.
International Search Report for Application No. PCT/US2001/043113, mailed Dec. 13, 2002, 2 pages.
Written Opinion of the International Searching Authority for Application No. PCT/US2001/043113, mailed May 1, 2003, 6 pages.
International Preliminary Examination Report for Application No. PCT/US2001/043113, mailed Nov. 6, 2003, 6pages.
International Search Report for Application No. PCT/US03/08719, mailed Jun. 19, 2003, 1 page.
Non-Final Office Action for U.S. Appl. No. 09/855,024 mailed Jun. 4, 2002, 10 pages.
Final Office Action for U.S. Appl. No. 09/855,024, mailed Jan. 15, 2003, 20 pages.
Advisory Action for U.S. Appl. No. 09/855,024, mailed May 2, 2003.
Notice of Allowance for U.S. Appl. No. 09/855,024, mailed Nov. 3, 2003.
Notice of Allowance for U.S. Appl. No. 09/855,024, mailed Dec. 15, 2003. 6 pages.
Non-Final Office Action for U.S. Appl. No. 10/810,301, mailed Mar. 17, 2005,11 pages.
Non-Final Office Action for U.S. Appl. No. 10/810,301, mailed Feb. 16, 2006, 12 pages.
Notice of Allowance for U.S. Appl. No. 10/810,301, mailed Jul. 28, 2006, 5 pages.
Notice of Allowance for U.S. Appl. No. 10/810,301, mailed Feb. 6, 2007, 9 pages.
Non-Final Office Action for U.S. Appl. No. 09/855,025, mailed Nov. 23, 2004, 17 pages.
Non-Final Office Action for U.S. Appl. No. 09/855,031, mailed May 22, 2002.
Non-Final Office Action for U.S. Appl. No. 09/855,031, mailed Dec. 10, 2002.
Final Office Action for U.S. Appl. No. 09/855,031, mailed Jul. 30, 2003.
Notice of Allowance for U.S. Appl. No. 09/855,031, mailed Nov. 4, 2003.
Non-Final Office Action for U.S. Appl. No. 10/736,680, mailed Feb. 16, 2006, 18 pages.
Final Office Action for U.S. Appl. No. 10/736,680, mailed Aug. 3, 2006, 10 pages.
Notice of Allowance for U.S. Appl. No. 10/736,680, mailed Feb. 22, 2007, 12 pages.
Non-Final Office Action for U.S. Appl. No. 10/210,041, mailed Sep. 10, 2003, 12 pages.
Final Office Action for U.S. Appl. No. 10/210,041, mailed Jan. 7, 2004, 14 pages.
Non-Final Office Action for U.S. Appl. No. 10/210,041, mailed Mar. 11, 2004, 12 pages.
Final Office Action for U.S. Appl. No. 10/210,041, mailed Jul. 7, 2004, 13 pages.
Non-Final Office Action for U.S. Appl. No. 10/210,041, mailed Feb. 9, 2005, 7 pages.
Final Office Action for U.S. Appl. No. 10/210,041, mailed Aug. 24, 2005, 7 pages.
Advisory Action for U.S. Appl. No.10/210,041, mailed Dec. 13, 2005, 4 pages.
Non-Final Office Action for U.S. Appl. No. 10/210,108, mailed Jun. 12, 2003, 6 pages.
Notice of Allowance for U.S. Appl. No. 10/210,108, mailed Oct. 7, 2003.
Requirement for Restriction/Election for U.S. Appl. No. 10/438,545, mailed Oct. 31, 2003.
Non-Final Office Action for U.S. Appl. No. 10/438,545, mailed Dec. 12, 2003, 7 pages.
Notice of Allowance for U.S. Appl. No. 10/438,545, mailed Jun. 15, 2004, 4 pages.
Non-Final Office Action for U.S. Appl. No. 10/832,086, mailed Sep. 19, 2007, 12 pages.
Final Office Action for U.S. Appl. No. 10/832,086, mailed May 1, 2008, 31 pages.

Advisory Action for U.S. Appl. No. 10/832,086, mailed Jul. 21, 2008, 4 pages.
Non-Final Office Action for U.S. Appl. No. 10/832,086, mailed Sep. 18, 2008, 18 pages.
Non Final Office Action for U.S. Appl. No. 10/832,086, mailed Apr. 1, 2009, 17 pages.
Final Office Action for U.S. Appl. No. 10/832,086, mailed Sep. 29, 2009, 26 pages.
Non-Final Office Action for U.S. Appl. No. 11/586,991, mailed Oct. 2, 2008, 23 pages.
Non-Final Office Action for U.S. Appl. No. 11/831,950, mailed Aug. 18, 2009, 49 pages.
Final Office Action for U.S. Appl. No. 11/831,950, mailed Jan. 6, 2010, 21 pages.
Non-Final Office Action for U.S. Appl. No. 11/953,742, mailed Nov. 19, 2009, 51 pages.
Non-Final Office Action for U.S. Appl. No. 11/953,743, mailed Nov. 23, 2009, 47 pages.
Non-Final Office Action for U.S. Appl. No. 11/953,745, mailed Nov. 24, 2009, 48 pages.
Non-Final Office Action for U.S. Appl. No. 11/953,751, mailed Nov. 16, 2009, 55 pages.
Non-Final Office Action for U.S. Appl. No. 11/779,714, mailed Sep. 1, 2009, 58 pages.
Non-Final Office Action for U.S. Appl. No. 10/810,208, mailed Jul. 16, 2007, 24 pages.
Non-Final Office Action for U.S. Appl. No. 10/810,208, mailed Dec. 18, 2007, 40 pages.
Final Office Action for U.S. Appl. No. 10/810,208, mailed Jun. 11, 2008, 34 pages.
Advisory Action for U.S. Appl. No. 10/810,208, mailed Aug. 27, 2008, 4 pages.
Non-Final Office Action for U.S. Appl. No. 10/810,208, mailed Feb. 13, 2009, 17 pages.
Non-Final Office Action for U.S. Appl. No. 10/810,208, mailed Aug. 24, 2009, 38 pages.
Requirement for Restriction/Election for U.S. Appl. No. 10/140,752, mailed May 18, 2006, 8 pages.
Non-Final Office Action for U.S. Appl. No. 10/140,752, mailed Dec. 14, 2006, 17 pages.
Non-Final Office Action for U.S. Appl. No. 10/140,752, mailed Apr. 23, 2007, 6 pages.
Non-Final Office Action for U.S. Appl. No. 10/140,752, mailed Jan. 24, 2008, 8 pages.
Notice of Allowance of U.S. Appl. No. 10/140,752, mailed Jul. 24, 2008, 14 pages.
Notice of Allowance of U.S. Appl. No. 10/140,752, mailed Sep. 10, 2008, 4 pages.
Non-Final Office Action for U.S. Appl. No. 11/668,322, mailed Mar. 23, 2009, 19 pages.
Requirement for Restriction/Election for U.S. Appl. No. 11/668,322, mailed Oct. 29, 2009, 6 pages.
Non-Final Office Action for U.S. Appl. No. 11/854,486, mailed Jul. 20, 2009, 29 pages.
Non-Final Office Action for U.S. Appl. No. 11/854,486, mailed Jan. 12, 2010, 23 pages.
Non-Final Office Action for U.S. Appl. No. 10/139,912, mailed Jan. 25, 2006, 14 pages.
Final Office Action for U.S. Appl. No. 10/139,912, mailed Aug. 11, 2006, 26 pages.
Non-Final Office Action for U.S. Appl. No. 10/139,912, mailed Apr. 20, 2007, 20 pages.
Final Office Action for U.S. Appl. No. 10/139,912, mailed Nov. 28, 2007, 20 pages.
Non-Final Office Action for U.S. Appl. No. 10/139,912, mailed Aug. 1, 2008, 21 pages.
Notice of Allowance for U.S. Appl. No. 10/139,912, mailed Feb. 5, 2009, 8 pages.
Notice of Allowance for U.S. Appl. No. 10/139,912, mailed Jun. 8, 2009, 8 pages.
Notice of Allowance for U.S. Appl. No. 10/139,912, mailed on Oct. 19, 2009, 17 pages.
Supplemental Notice of Allowance for U.S. Appl. No. 10/139,912, mailed on Nov. 23, 2009, 4 pages.
Requirement for Restriction/Election for U.S. Appl. No. 10/140,751, mailed Apr. 27, 2006, 5 pages.
Non-Final Office Action for U.S. Appl. No. 10/140,751, mailed Aug. 10, 2006, 15 pages.
Final Office Action for U.S. Appl. No. 10/140,751, mailed Apr. 10, 2007, 16 pages.
Non-Final Office Action for U.S. Appl. No. 10/140,751, mailed Oct. 30, 2007, 14 pages.
Final Office Action for U.S. Appl. No. 10/140,751, mailed May 28, 2008, 19 pages.
Non-Final Office Action for U.S. Appl. No. 10/140,751, mailed Sep. 17, 2008, 15 pages.
Final Office Action for U.S. Appl. No. 10/140,751, mailed Mar. 17, 2009, 17 pages.
Advisory Action for U.S. Appl. No. 10/140,751, mailed Jun. 1, 2009, 3 pages.
Non-Final Office Action for U.S. Appl. No. 10/140,751, mailed Sep. 28, 2009, 34 pages.
Non-Final Office Action for U.S. Appl. No. 11/745,008, mailed May 14, 2009, 27 pages.
Final Office Action for U.S. Appl. No. 11/745,008, mailed Dec. 30, 2009, 27 pages.
Non-Final Office Action for U.S. Appl. No. 10/141,223, mailed Feb. 23, 2006, 25 pages.
Non-Final Office Action for U.S. Appl. No. 10/141,223, mailed Feb. 13, 2007, 29 pages.
Final Office Action for U.S. Appl. No. 10/141,223, mailed Aug. 21, 2007, 25 pages.
Non-Final Office Action for U.S. Appl. No. 10/141,223, mailed Dec. 28, 2007, 13 pages.
Non-Final Office Action for U.S. Appl. No. 10/141,223, mailed Sep. 3, 2008, 22 pages.
Non-Final Office Action for U.S. Appl. No. 10/139,831, mailed Oct. 17, 2005, 7 pages.
Notice of Allowance for U.S. Appl. No. 10/139,831, mailed Feb. 9, 2006, 7 pages.
Non-Final Office Action for U.S. Appl. No. 10/139,831, mailed Jun. 27, 2006, 9 pages.
Final Office Action for U.S. Appl. No. 10/139,831, mailed Nov. 28, 2006, 17 pages.
Notice of Allowance for U.S. Appl. No. 10/139,831, mailed Jun. 14, 2007, 26 pages.
Notice of Allowance for U.S. Appl. No. 10/139,831, mailed Jun. 26, 2007, 25 pages.
Non-Final Office Action for U.S. Appl. No. 11/828,246, mailed Jun. 15, 2009, 26 pages.
Notice of Allowance for U.S. Appl. No. 11/828,246, mailed Nov. 16, 2009, 20 pages.
Non-Final Office Action for U.S. Appl. No. 10/140,088, mailed Apr. 27, 2006, 13 pages.
Notice of Allowance for U.S. Appl. No. 10/140,088, mailed Sep. 7, 2006, 13 pages.
Notice of Allowance for U.S. Appl. No. 10/140,088, mailed Oct. 24, 2006, 8 pages.
Notice of Allowance for U.S. Appl. No. 10/140,088, mailed Jan. 11, 2007, 5 pages.
Non-Final Office Action for U.S. Appl. No. 11/621,038, mailed Apr. 23, 2009, 44 pages.
Final Office Action for U.S. Appl. No. 11/621,038, mailed Dec. 23, 2009, 27 pages.
Non-Final Office Action for U.S. Appl. No. 12/198,697, mailed Feb. 2, 2010, 50 pages.
Non-Final Office Action for U.S. Appl. No. 10/140,749, mailed Aug. 10, 2006, 22 pages.
Final Office Action for U.S. Appl. No. 10/140,749, mailed Jun. 27, 2007, 23 pages.
Final Office Action for U.S. Appl. No. 10/140,749, mailed Jan. 8, 2008, 23 pages.
Non-Final Office Action for U.S. Appl. No. 10/140,749, mailed Jun. 6, 2008, 28 pages.

Final Office Action for U.S. Appl. No. 10/140,749, mailed Dec. 8, 2008, 30 pages.
Non-Final Office Action for U.S. Appl. No. 10/140,749, mailed May 27, 2009, 38 pages.
Final Office Action for U.S. Appl. No. 10/140,749, mailed Jan. 13, 2010, 44 pages.
Non-Final Office Action for U.S. Appl. No. 10/140,753, mailed Apr. 20, 2006, 11 pages.
Final Office Action for U.S. Appl. No. 10/140,753, mailed Jan. 10, 2007, 27 pages.
Non-Final Office Action for U.S. Appl. No. 10/140,753, mailed Aug. 22, 2007, 14 pages.
Non-Final Office Action for U.S. Appl. No. 10/140,753, mailed Jan. 8, 2008, 14 pages.
Final Office Action for U.S. Appl. No. 10/140,753, mailed Aug. 25, 2008, 22 pages.
Requirement for Restriction/Election for U.S. Appl. No. 11/000,359, mailed Jun. 20, 2008, 7 pages.
Non-Final Office Action for U.S. Appl. No. 11/000,359, mailed Oct. 23, 2008, 28 pages.
Non-Final Office Action for U.S. Appl. No. 11/000,359, mailed May 29, 2009, 14 pages.
Notice of Allowance for U.S. Appl. No. 11/000,359, mailed Sep. 22, 2009, 17 pages.
Requirement for Restriction/Election for U.S. Appl. No. 11/118,697, mailed Jun. 2, 2009, 8 pages.
Notice of Allowance for U.S. Appl. No. 11/118,697, mailed Sep. 30, 2009, 41 pages.
Non-Final Office Action for U.S. Appl. No. 09/855,038, mailed Jun. 2, 2005, 14 pages.
Final Office Action for U.S. Appl. No. 09/855,038, mailed Feb. 7, 2006, 8 pages.
Non-Final Office Action for U.S. Appl. No. 09/855,038, mailed Oct. 4, 2006, 14 pages.
Notice of Allowance for U.S. Appl. No. 09/855,038, mailed Apr. 26, 2007, 8 pages.
Requirement for Restriction/Election for U.S. Appl. No. 09/988,066, mailed Dec. 13, 2005, 7 pages.
Non-Final Office Action for U.S. Appl. No. 09/988,066, mailed Jul. 14, 2006, 17 pages.
Non-Final Office Action for U.S. Appl. No. 09/988,066, mailed Apr. 6, 2007, 22 pages.
Final Office Action for U.S. Appl. No. 09/988,066, mailed Oct. 31, 2007, 16 pages.
Advisory Action for U.S. Appl. No. 09/988,066, mailed May 28, 2008, 4 pages.
Notice of Allowance for U.S. Appl. No. 09/988,066, mailed Oct. 30, 2008, 16 pages.
Notice of Allowance for U.S. Appl. No. 09/988,066, Mailed Jan. 9, 2009.
Non Final Office Action U.S. Appl. No.11/804,977, mailed Jan. 14, 2008, 13 pages.
Notice of Allowance for U.S. Appl. No. 11/804,977, mailed Nov. 19, 2008, 17 pages.
Non-Final Office Action for U.S. Appl. No. 09/855,015, mailed Oct. 28, 2004, 12 pages.
Non-Final Office Action for U.S. Appl. No. 09/855,015, mailed Jan. 12, 2006, 6 pages.
Notice of Allowance for U.S. Appl. No. 09/855,015, mailed Sep. 8, 2006, 3 pages.
Requirement for Restriction/Election for U.S. Appl. No. 09/855,015, mailed Nov. 3, 2006, 6 pages.
Notice of Allowance for U.S. Appl. No. 09/855,015, mailed Jan. 7, 2008, 4 pages.
Supplemental Notice of Allowance for U.S. Appl. No. 09/855,015, mailed Feb. 4, 2008, 3 pages.
Non-Final Office Action for U.S. Appl. No. 11/611,067, mailed Feb. 20, 2009, 11 pages.
Final Office Action for U.S. Appl. No. 11/611,067, mailed Oct. 16, 2009, 35 pages.
Non-Final Office Action for U.S. Appl. No. 11/611,067, mailed Dec. 8, 2009, 11 pages.
Non-Final Office Action for U.S. Appl. No. 11/615,769, mailed Apr. 15, 2009, 11 pages.
Final Office Action for U.S. Appl. No. 11/615,769, mailed Jan. 22, 2010, 34 pages.
U.S. Appl. No. 12/795,492, Jun. 7, 2010, Davis et al.
U.S. Appl. No. 12/702,031, filed Feb. 8, 2010, Davis.
U.S. Appl. No. 12/466,277, filed May 14, 2009, Lin.
"Skip Lists: A Probabilistic Alternative to Balanced Trees," 8 pages, at URL: http://epaperpress.com/sortsearch/download/skiplist.pdf.
Shah et al., "Fast Incremental Updates on Ternary-CAMs for Routing Lookups and Packet Classification," pp. 1-9, at URL: http://www.hoti.org/archive/hoti8papers/018.pdf.
Non-Final Office for U.S. Appl. No. 12/400,645, mailed on Sep. 1, 2010, 45 pages.
U.S. Appl. No. 12/198,710, filed Aug. 26, 2008, Zhang et al.
Non-Final Office Action for U.S. Appl. No. 11/646,845, mailed on Oct. 4, 2010, 48 pages.
Non-Final Office Action for U.S. Appl. No. 12/198,697, mailed on Oct. 25, 2010, 36 pages.
Non-Final Office Action for U.S. Appl. No. 12/198,710, mailed on Sep. 28, 2010, 15 pages.
Final Office Action for U.S. Appl. No. 12/400,594, mailed on Oct. 28, 2010, 13 pages.
Non-Final Office Action for U.S. Appl. No. 12/372,390, mailed on Sep. 13, 2010, 10 pages.
Non-Final Office Action for U.S. Appl. No. 12/505,390, mailed on Oct. 28, 2010, 51 pages.
U.S. Appl. No. 12/880,518, filed Sep. 13, 2010, Wong.
U.S. Appl. No. 12/883,073, filed Sep. 15, 2010, Davis.
U.S. Appl. No. 12/900,279, filed Oct. 7, 2010, Bansal et al.
Final Office Action for U.S. Appl. No. 11/779,714, mailed on Nov. 9, 2010, 24 pages.
Non-Final Office Action for U.S. Appl. No. 10/140,751, mailed Dec. 20, 2010, 23 pages.
Requirement for Restriction/Election for U.S. Appl. No. 12/639,749, mailed on Dec. 7, 2010, 3 pages.
Notice of Allowance for U.S. Appl. No. 12/400,645, mailed on Jan. 26, 2011, 14 pages.
Final Office Action for U.S. Appl. No. 12/070,893, mailed on Nov. 24, 2010, 11 pages.
Non-Final Office Action for U.S. Appl. No. 11/953,742, mailed on Mar. 30, 2011, 23 pages.
Non-Final Office Action for U.S. Appl. No. 11/953,751, mailed on Mar. 29, 2011, 29 pages
Non-Final Office Action for U.S. Appl. No. 11/779,778, mailed on Feb. 2, 2011, 63 pages.
Final Office Action for U.S. Appl. No. 11/668,322, mailed on Feb. 1, 2011, 17 pages.
Non-Final Office Action for U.S. Appl. No. 12/795,492, mailed on Mar. 17, 2011, 51 pages.
Non-Final Office Action for U.S. Appl. No. 12/198,710, mailed on Mar. 24, 2011, 40 pages.
Notice of Allowance for U.S. Appl. No. 12/639,749, mailed on Feb. 11, 2011, 51 pages.
Notice of Allowance for U.S. Appl. No. 12/400,594, mailed on Mar. 23, 2011, 11 pages.
Notice of Allowance for U.S. Appl. No. 12/372,390, mailed on Mar. 9, 2011, 8 pages.
Non-Final Office Action for U.S. Appl. No. 12/070,893, mailed on Mar. 18, 2011, 7 pages.

* cited by examiner

DOUBLE DENSITY CONTENT ADDRESSABLE MEMORY (CAM) LOOKUP SCHEME

CROSS REFERENCE TO RELATED APPLICATION

The present application is a continuation application of U.S. application Ser. No. 11/118,697, filed Apr. 28, 2005, now U.S. Pat. No. 7,657,703, issued Feb. 2, 2010, which claims the benefit under 35 U.S.C. §119(e) of U.S. Provisional Patent Application Ser. No. 60/623,435, entitled "DOUBLE DENSITY CAM LOOKUP SCHEME WITHOUT ACTUAL HARDWARE CAPABILITY," filed Oct. 29, 2004, assigned to the same assignee as the present application. The entire contents of the 60/623,435 and Ser. No. 11/118,697 applications are incorporated herein by reference for all purposes.

TECHNICAL FIELD

This disclosure relates generally to a content addressable memory (CAM), and to communication networks. More particularly, but not exclusively, the present disclosure relates to techniques to use an address portion of a packet to program and read a CAM residing in a networking device of a communication network.

BACKGROUND INFORMATION

In a communication network, data is typically encapsulated and transported within the communication network in units, which in certain contexts may be called frames, packets, Internet Protocol (IP) packets, cells, or the like. Herein, such units will broadly be called "packets" for ease of nomenclature, unless for the sake of example, a particular such unit is appropriate. Each such packet includes a header with a source address and a destination address, and a payload. The destination address may, for example, indicate a network address of a next intermediate "hop" for the packet and/or a network address of the ultimate destination for the packet.

Content addressable memories (CAMs) are used for a variety of functions in many different processing environments. CAMs are typically in the form of hardware that receives a piece of data and that returns a memory address storing information pertaining to that data. One use of CAMs is in the field of packet routing over a communication network.

For instance, CAMs may be used in the following manner by network devices to forward data packets. A typical network device has multiple ports that are connected to one or more other processing systems. The ports each receive packets from and send packets to the processing system(s) connected to the port. A switching fabric in the network device connects the ports of the network device to one another to allow the network device to pass a packet received on a first port to a second port of the network device, which then transmits the packet to the processing system(s) connected to the second port. In order to forward the packet, each port has a CAM that stores the prefixes of IP addresses and/or stores data that indexes or otherwise points to locations of a memory connected to the port. In the latter case, the CAM is used to return an address in the memory that stores next hop information for the IP address. When that next hop address ultimately is obtained, the packet is routed to that hop address via the associated port of the network device.

Typically, hardware within the network device (e.g., logic circuits, FPGAs, ASICS, etc.) is required to do two CAM lookups for every packet to find the route to forward the packet. If, for instance, a CAM with a length of 64 bits or greater is used, the hardware first masks the right 32 bits and finds the best path in the left side of the CAM. Next, the hardware masks the left 32 bits of the CAM and finds the best path in the right side of the CAM. Based on an assigned preference or some other criteria, the hardware will select the best path (e.g., identify a memory location that stores the network address of the next destination for the packet) between the two best paths identified in the searches of the left and right sides of the CAM. For the processes thus described, the hardware has to either be capable of doing parallel lookups on the left and right sides of the CAM or has to be able to do two lookups, while still meeting the timing requirements for forwarding the packet.

The need to perform two CAM lookups adds to the complexity and cost of the required hardware of the network device. Moreover, performing two CAM lookups can also adversely affect timing. The required hardware can be simplified if data is only stored in one side of the CAM, such as if the data occupies only the left (or the right) 32-bits in each 64-bit CAM entry, thereby allowing use of only one mask. However, such a scheme results in waste (non-use) of 50% of the available storage space in the CAM.

SUMMARY

An embodiment of the present invention includes a method that associates a network address to either first or second sections of a memory (e.g., a CAM). The association to the first or to the second sections of the memory is based on a value of at least one bit of the network address.

For instance, a packet is received. A network address associated with the packet is examined, including determining a value related to at least one bit of the network address. The determined value of the bit of the network address is used to select either the first or the second sections of the memory to program or to search, depending on the context. In a program operation context, the selected section of the memory is then programmed with the network address. In a search operation context, the selected section of the memory is searched for an associated network address that matches the network address of the packet. The associated next hop information for the network address may be retrieved from the memory, and used in a further operation, such as a packet forwarding operation or a further lookup operation.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various views unless otherwise specified.

DETAILED DESCRIPTION

Embodiments of techniques to perform CAM lookups for use in connection with packet routing are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an introduction, an embodiment reduces the number of CAM lookups from two, as in the background example provided above, to one. To allow this, an embodiment initially populates each side (left and right sides) of a CAM based on a portion of a network address. More specifically according to various embodiments, certain bits of a network address of a packet are examined and used to determine whether the particular network address is to be placed on the left or right sides of the CAM. The determination of whether to program a network address either on the left or right sides of the CAM can be performed according various grouping techniques, including, without limitation, by examining an individual bit of the network address, by performing an exclusive OR (XOR) operation on a plurality of bits of the network address, or by searching for bit patterns of the network address in a decision table. Network addresses that cannot be readily assigned to a particular side of the CAM using these grouping techniques may be programmed into both sides of the CAM.

During a packet routing operation, a destination network address of a packet received by a network device is examined. More particularly, one or more bits of the destination network address of the received packet are examined to determine whether the left or right side of the CAM is to be searched. This determination uses the same criteria as the grouping technique that was used to program the CAM. When the side of the CAM to be searched is identified and selected, that side is searched to locate a network address that matches the destination network address specified in the received packet. The memory location of the matching network address in the CAM may be mapped or otherwise associated to another memory location that contains the network address of the next hop for the packet. That particular memory location is then accessed to obtain the address so that the packet may be routed thereto by the network device.

Figure 1:
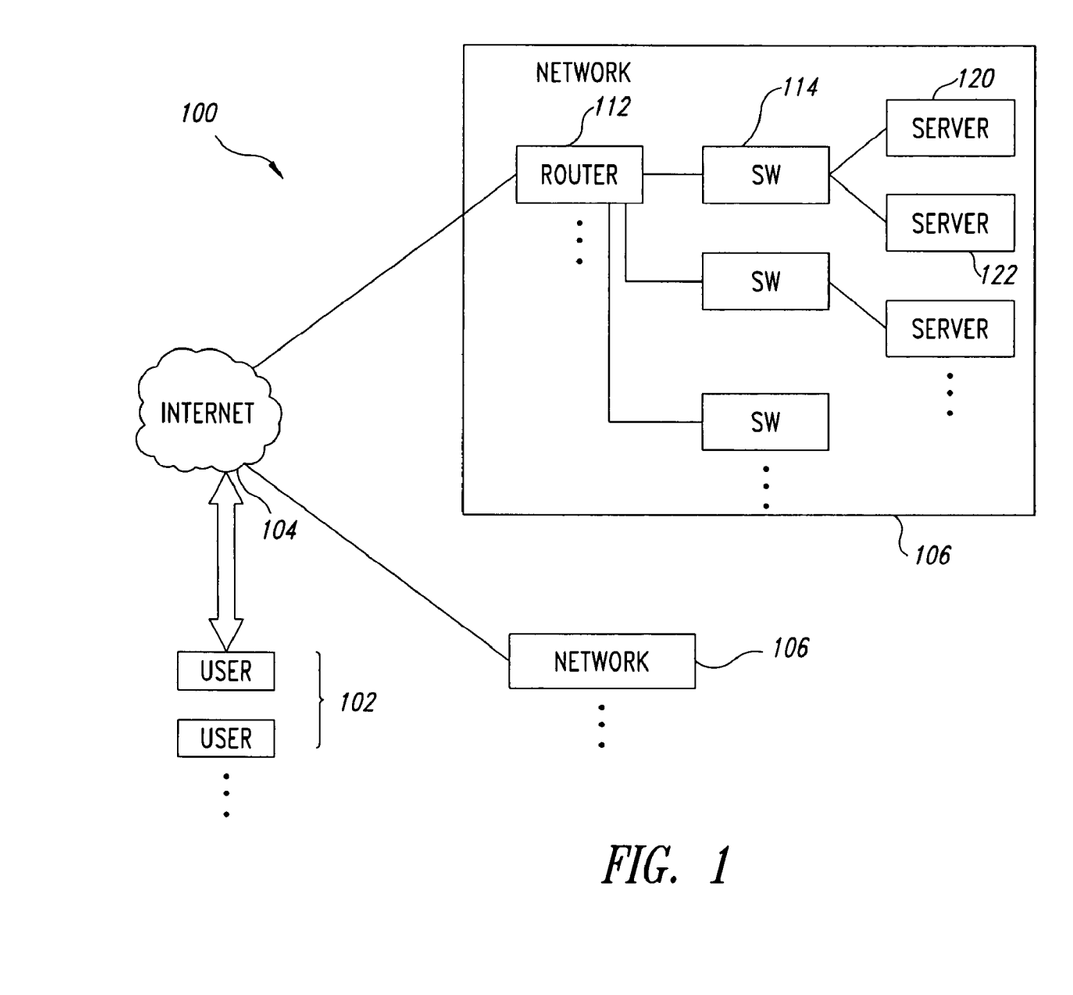
FIG. 1 is a block diagram of a communication network in which an embodiment can operate.

FIG. 1 is a block diagram of a communication network 100 in which an embodiment can operate to route packets based on a CAM lookup. For purposes of simplicity of explanation, not all of the various devices that may be present in the communication network 100 (such as DNS servers, hubs, switches, routers, and so on) are shown or described.

The communication network 100 includes a plurality of users 102, which can include any sort of suitable user-side client devices. The users 102 are communicatively coupled to a communication network 104, which can comprise the Internet, an intranet, local area network (LAN), virtual private network (VPN), or other network or portion or combination thereof. For purposes of explanation, the communication network 104 will be described in the context of the Internet herein.

Via the communication network 104, the users 102 can communicate with different networks 106. These individual networks 106 can comprise web sites, VPNs, LANs, server clusters, or other types of network arrangements. In an embodiment, each of the networks 106 can be associated with a network address.

Each network 106 comprises one or more routers 112. One or more switches 114 are coupled to the router 112. In an embodiment, a plurality of servers 120 and 122 are coupled to any one of the switches 114. In an embodiment, the routers 112, switches 114, servers 120 and 122, or any other network device also can be associated with a respective network address.

For ease of explanation and without intending to be limiting, examples herein of such network addresses will be described in the context of IP addresses, such as IPv6 addresses, Layer 3 addresses, etc. as some illustrative examples. It is appreciated that other types of network addresses, such as for example network addresses that have a parent-child or other hierarchical relationship, may operate in conjunction with other embodiments. A non-limiting example of a network address model with which an embodiment may operate is the Classless Inter-Domain Routing (CIDR) model, which is sometimes referred to as "supernetting."

The CIDR is an IP addressing scheme that replaces an older system that used 32-bit addresses that were in three classes: A, B, and C. Each address in this older system had two parts: one part to identify a unique network and the second part to identify a unique host in that network. Another way the old Class A, B, and C addresses were identified was by looking at the first 8 bits of the address and converting it to its decimal equivalent, as set forth in the table below.

| Address Class | # Network Bits | # Hosts Bits | Decimal Address Range |
|---|---|---|---|
| Class A | 8 bits | 24 bits | 1-126 |
| Class B | 16 bits | 16 bits | 128-191 |
| Class C | 24 bits | 8 bits | 192-223 |

Because Internet addresses were generally only assigned in these three sizes, there were a lot of wasted addresses. The overall result was that, while the Internet was running out of unassigned addresses during its rapid growth in the 1980s and 1990s, only a small percentage of the assigned addresses were actually being used. CIDR was developed to be a much more efficient method of assigning addresses.

A CIDR address includes the standard 32-bit IP address and also information on how many bits are used for a network prefix. For example, in the CIDR address 206.13.01.48/25, the "/25" indicates the first 25 bits are used to identify the unique network leaving the remaining bits to identify the specific host.

The table below shows the association between the prefix number and the number of hosts.

| CIDR Block Prefix | # of Host Addresses |
|---|---|
| /27 | 32 hosts |
| /26 | 64 hosts |
| /25 | 128 hosts |
| /24 | 256 hosts |
| /23 | 512 hosts |

-continued

| CIDR Block Prefix | # of Host Addresses |
|---|---|
| /22 | 1,024 hosts |
| /21 | 2,048 hosts |
| /20 | 4,096 hosts |
| /19 | 8,192 hosts |
| /18 | 16,384 hosts |
| /17 | 32,768 hosts |
| /16 | 65,536 hosts |
| /15 | 131,072 hosts |
| /14 | 262,144 hosts |
| /13 | 524,288 hosts |
| /12 | 1,048,576 |

The CIDR addressing scheme also enables "route aggregation" in which a single high-level route entry can represent many lower-level routes in the global routing tables. Currently, big blocks of addresses are assigned to the large Internet Service Providers (ISPs) who then re-allocate portions of their address blocks to their customers. For example, a large ISP may be assigned a CIDR address block with a prefix of /15 (equivalent to 512 Class C addresses or 131,072 host addresses) and, in turn, may assigns its customers CIDR addresses with prefixes ranging from /27 to /19. These customers, who may be smaller ISPs themselves, in turn re-allocate portions of their address block to their users and/or customers. However, in the global routing tables all these different networks and hosts can be represented by a single Internet route entry. In this way, the growth in the number of routing table entries at each level in the network hierarchy has been significantly reduced. Currently, the global routing tables have approximately 135,000-150,000 entries.

Using the super-netting of the CIDR model, the IP address 192.168.2.0/24 and an adjacent IP address 192.168.3.0/24, for example, can be merged into 192.168.2.0/23. The "23" at the end of the address indicates that the first 23 bits are the network part of the address, leaving the remaining nine bits for specific host addresses. The network and hosts form a parent-child relationship in the CIDR model.

In an embodiment, the parent-child relationships associated with super-netting are preserved or otherwise maintained when programming sides of the CAM with IP addresses.

In one example embodiment, the CAM programming and lookup schemes are implemented in hardware (e.g., FPGA or ASIC) of the router 112 (or some other suitable Layer 3 network device). It is appreciated, however, that the CAM programming and lookup schemes of other embodiments may be implemented in other types of network devices (e.g., where it is desirable to minimize the number of memory lookups).

Figure 2:
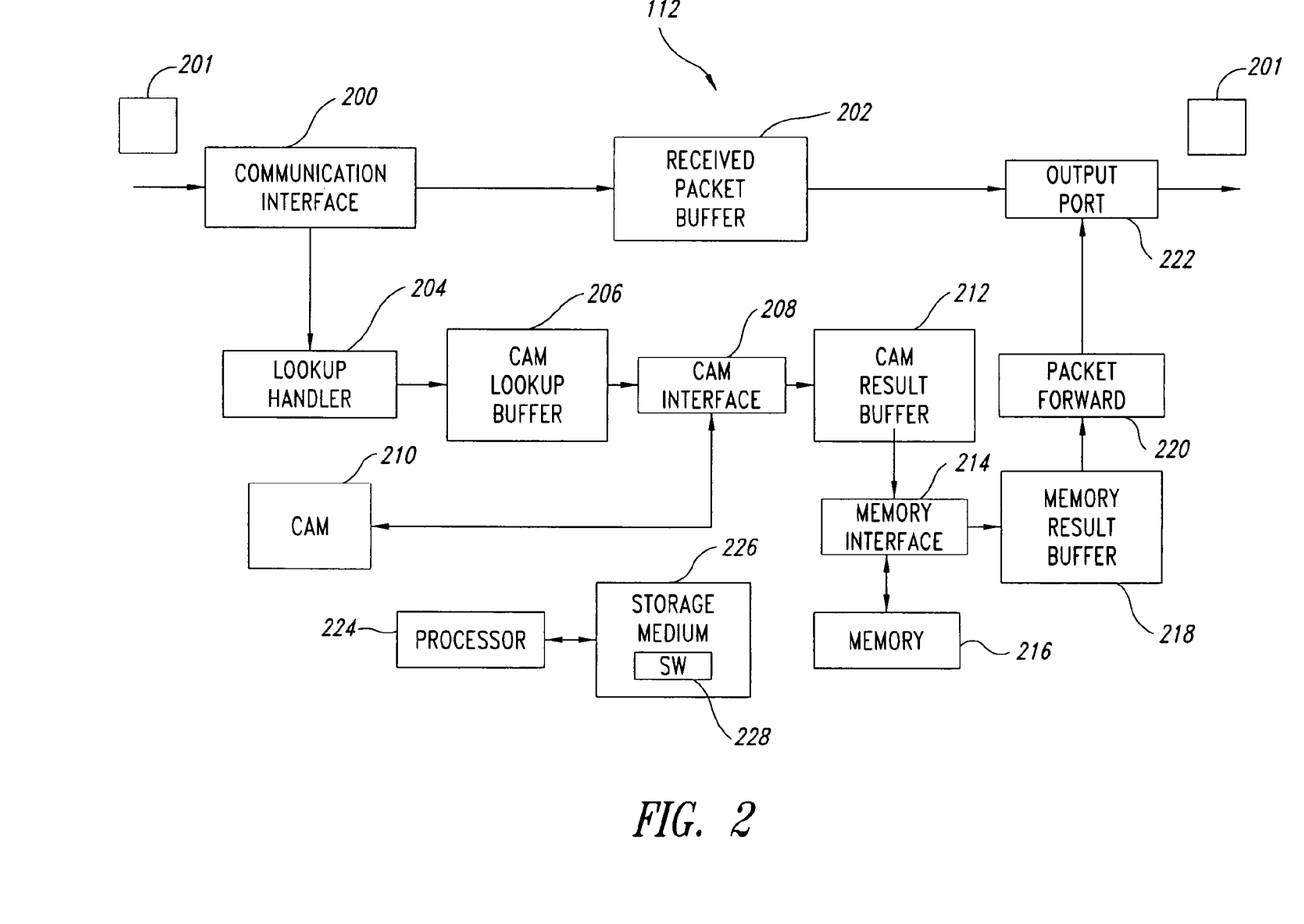
FIG. 2 is a block diagram of an example network device from the embodiment of FIG. 1 that can implement an embodiment to route packets based on a CAM lookup.

FIG. 2 is a block diagram of an example network device (such as the router 112) from the communication network 100 of FIG. 1 that can implement an embodiment to route packets based on a CAM lookup. In FIG. 2, for the sake of brevity and clarity, only certain components of the router 112 that are useful in understanding operation of an embodiment are shown and described.

The router 112 receives an incoming packet 201 (such as an IP packet) at an input port or other communication interface 200. Part of the communication interface 200 can comprise a Media Access Control (MAC) interface. The received packet 201 is placed in a buffer 202.

Once received from the communication interface 200, a packet lookup handler 204 analyzes the packet 201. The lookup handler 204 can comprise hardware, software, or a combination of both. The lookup handler 204 of an embodiment extracts relevant information from the packet 201 (e.g., the packet's IP destination address) as will be described in greater detail below), and initiates at least one CAM lookup based on the extracted bit(s).

The lookup handler 204 may also start a destination MAC address lookup, source MAC address lookup, ACL lookup, or other lookup. With regards to a CAM lookup, a CAM lookup buffer 206 stores data that will be a basis for the CAM lookup. Examples of such data is a binary value (1 or 0) of a particular bit of the IP destination address, an XOR value of bits of the IP destination address, or other information indicative of which side of a CAM 210 to search (i.e., CAM side selection). A CAM interface 208 applies the appropriate cam side mask for the IP destination address and performs the searching of the selected one of the sides of the CAM 210 to find a CAM index or row that contains information that identifies or is associated with the IP address of the packet 201 (i.e., CAM data lookup).

The CAM 210 of one embodiment has a section or portion where network masks for additional network addresses are stored. A network mask is applied to a destination IP address and then compared with the contents of the CAM 210. This section of the CAM 210 is called a "shadow section," where for every CAM entry, a corresponding network mask is stored. Other forms of mask storage may be used in other embodiments.

The matching result obtained from the searching of the CAM 210 is placed by the CAM interface 208 into a CAM result buffer 212. After the results of the CAM lookup are available in the CAM result buffer 212, a memory interface 214 obtains the next hop information (or other information associated with a subsequent IP address to route the packet 201) from a location in a memory 216 that corresponds to the CAM lookup results. In an embodiment, the memory 216 comprises a partitioned random access memory (e.g., PRAM), though it is appreciated that other types of memories may be used. In one embodiment, there is a one-to-one mapping between CAM and PRAM indexes. One or more CAMs 210 and memories (PRAMs) 216 can be provided for each router 112.

The memory interface 214 places the information obtained from memory 216 into a memory results buffer 218. The contents of the memory results buffer 218 are provided to a packet forwarding component 220, which controls forwarding of the packet 201 from the received packet buffer 202 to an appropriate output port 222, according to the information obtained from the memory 216.

In an embodiment, the router 112 can include one or more processors 224 to control operation of the various components of the router 112. For example, the processor 224 may control the address extraction performed by the lookup handler 204, the CAM lookups performed by the CAM interface 208, and so forth. One or more machine-readable storage media 226 can be accessible to the processor 224. The storage medium 226 can store software or other machine-readable instructions 228 that can be executed by the processor 224. For instance, the machine-readable instructions 228 of an embodiment can include instructions to maintain and operate a software version of a decision table, which will be described in further detail below. The instructions 228 can also include instructions to perform various calculations and operations to determine the proper side of the CAM 210 to search, alternatively or additionally to embodiments that perform such operations using hardware.

Figure 3:
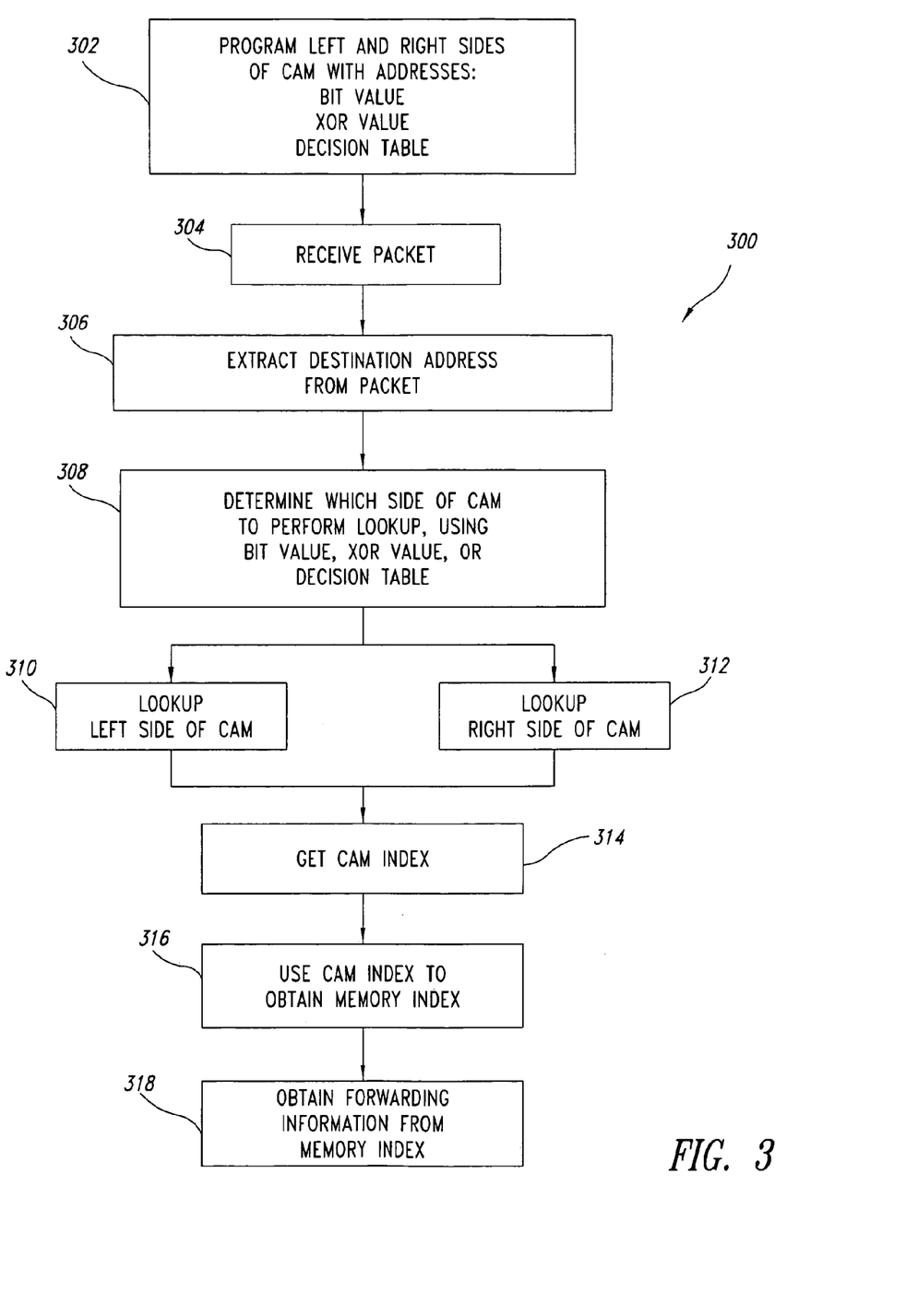
FIG. 3 is a flowchart that depicts CAM programming and routing using a CAM lookup according to various embodiments.

FIG. 3 is a flowchart 300 that builds upon the block diagram of FIG. 2, and which depicts CAM programming and packet routing using a CAM lookup according to various embodiments. It is appreciated that the various elements of the flowchart 300 need not necessarily occur in the exact order shown. Moreover, it is possible to add, remove, combine, or modify some of the depicted elements. In one embodiment, some of the elements in the flowchart 300 may be implemented in software or other machine-readable instructions stored on a machine-readable medium and executable by a processor (e.g., the machine-readable instructions 228 stored in the storage medium 226 and executable by the processor 224 of FIG. 2).

At a block 302, left and right sides of the CAM 210 of FIG. 2 are selectively programmed with IP addresses. In other embodiments, the CAM 210 or other memory may have its memory locations apportioned differently than "left" or "right" "sides", and therefore, the block 302 and the various CAM programming and searching embodiments described herein can be suitably adapted for these other memory location configurations. For example, rather than having memory locations arranged side by side (e.g., memory locations that are 32-bits wide, with two memory locations per row to thereby provide the CAM 210 with a 64-bit length), one embodiment of the CAM 210 can have its memory locations arranged as a single 32-bit column. In such an embodiment, it can be in the upper or the lower portions of the CAM where the selective programming or searching is performed. Moreover, it is appreciated that the CAM 210 can be sized such that it is not necessarily restricted to just 64-bits, with 32-bit left and right side portions. The CAM 210, for instance in another embodiment, can have any number of 32-bit wide columns. Accordingly, the programming depicted in the block 302 can be performed on a CAM or other memory having any suitable size and configuration. As will be described in further detail below, the addresses to program into the left and right sides, for example, of the CAM 210 can be based on a particular bit value of a destination network address, an XOR value of a plurality of bits of the destination network address, or bit patterns of the destination network address that can be correlated to a decision table, among other possibilities.

At a block 304, a packet 201 is received, such as at the communication interface 200 of FIG. 2. At a block 306, the lookup handler 204 extracts the destination address from the received packet 201.

At a block 308, the lookup handler 204 (or other suitable component of the router 112) determines on which side of the CAM 210 to perform the lookup. According to various embodiments, the same techniques used to program the CAM 210 with destination network addresses can be used to determine which side of the CAM 210 to lookup. For example, an embodiment can examine the $28^{th}$ bit of the received packet 201's destination address to determine whether that bit is a 1 or a 0. If that bit is a 1, for instance, then the lookup is performed on the right side of the CAM 210. If that bit is a 0, for instance, then the lookup is performed on the left side of the CAM 210. Further details of this type of lookup (in the context of programming the CAM 210) will be provided later below.

Blocks 310 and 312 respectively depict lookups on the left or right sides of the CAM 210 based on the determination made in the block 308. For instance, if the determination at the block 308 yields a left-side lookup, then the left-most 32 bits of the CAM 210 are searched to locate a particular CAM index (which in one embodiment corresponds to a CAM row) that contains a network address that matches the received packet's network address in some manner, such as an exact match or a match of a child address to a parent address in a super-netting relationship. Meanwhile, the right-most 32-bits of the CAM 210 are masked.

At a block 314, the CAM index is obtained. In one embodiment, the CAM index is the row number of the location in the CAM 210 where the match or best fit to the term being searched (e.g., the packet destination address, which was located during the search in block 310 or 312). At a block 316, the obtained CAM index is used to obtain a memory index (e.g., a PRAM index) of the memory 216. In one example embodiment, there is a one-to-one mapping of CAM indices to PRAM indices.

In a situation where the CAM 210 includes a 64-bit column having an upper 32 bits, which may be termed the "left side" of the CAM 210 to be consistent with the discussion above, and a lower 32 bits, which may be considered the "right side" of the CAM 210 to be consistent with the discussion above, the searching of the CAM 210 will return the same CAM index (same CAM row) whether the "hit" or "match" from the lookups at the blocks 310 and 312 belongs to upper or lower 32-bit entry, an embodiment uses the following example technique in the block 316 to determine which PRAM index corresponds to the particular CAM index:

For hits on the left side of the CAM 210:
CAM Hit for upper 32 bit: PRAM Index=(CAM_INDEX)*2
For hits on the right side of the CAM 210:
CAM Hit for lower 32 bits: PRAM Index=(CAM_INDEX)*2+1

Such a technique to locate the appropriate PRAM index can be performed using a field programmable gate array (FPGA), which may comprise part of the memory interface 214 of FIG. 2. Other techniques may be used in other embodiments to map specific CAM entries to specific entries in the memory 216.

At a block 318, the specific PRAM index in the memory 216 is accessed to obtain the forwarding information for the received packet (i.e., the forwarding information is resident in the memory 216 at the location corresponding to the index). The forwarding information can include, for example, a next hop IP address to forward the packet.

To further illustrate operation of one or more embodiments in the context of programming and searching the CAM 210, such as in the blocks 302 and 316 of FIG. 3, various examples are provided next in the context of Internet Protocol version 4 (IPv4) addresses, which are 32 bits in length. The CAM 210 used in connection with these IPv4 addresses comprises 64 bit-wide columns with a suitable number of rows. To be able to efficiently use the entire available storage of the CAM 210, two 32-bit IPv4 entries are programmed into each row of the CAM 210 (e.g., one entry is programmed into the upper 32 bits (which may be considered a "left side" of the CAM using the above terminology) and another entry is programmed into the lower 32 bits of the CAM 210. It is appreciated that the use of a 64-bit CAM with upper and lower 32-bit portions is a non-limiting example, and that other types and sizes of CAMs can be used with other embodiments.

When a packet is received and its or IP destination address is examined, selection of the particular side of the CAM 210 to be searched (i.e., mask selection) is based on a decision table as programmed by hardware and/or software or based on a special mode such as ($28^{th}$ bit or XOR), all of which will be explained below in further detail. The mask determines which side of the CAM 210 is being searched and is not being searched for this IP address. Based on this mask and extracted IP destination address from the packet, a single lookup (as opposed to two lookups in existing systems) is performed.

According to various example embodiments, mask selection (i.e., whether to search the left or right side of the CAM 210) could be based on a decision table or some special mode, such as: (1) examining the $28^{th}$ bit of the IP destination address (yields a binary 1 or 0); (2) determining an Exclusive OR (XOR) result of the $26^{th}$ and $27^{th}$ bits of the IP destination address (yields a binary 1 or 0); or (3) using a plurality of the most significant bits (MSB) of the IP destination address as an index into a decision table containing binary data (yields a binary 1 or 0); for example, the software can specify to use bits 26, 27, and 28 of the IP address.

Examples of CAM Programming:

The following discussion provides various three specific examples of the manner in which the CAM 210 can be programmed or otherwise have CAM memory locations associated with IP addresses. As a baseline illustration, assume that, in each of the following three examples, five IP destination addresses are to be programmed into the CAM 210. The five IP destination addresses are:

| | |
|---|---|
| 10.0.0.0/8 | (10 in binary is: 00001010) |
| 10.10.0.0/16 | (10 in binary is: 00001010) |
| 20.10.0.0/16 | (20 in binary is: 00010100) |
| 16.0.0.0/8 | (16 in binary is: 00010000) |
| 28.10.10.0/24 | (28 in binary is: 00011100) |

Using the 0-based indexing scheme, the first least significant bit (LSB) is indexed as bit 0 and the last MSB is indexed as bit $31^{st}$. Therefore, in the example address above for 28 in binary, the $31^{st}$ through the $24^{th}$ bits are, respectively, 00011100.

1. Using the $28^{th}$ Bit of the IP Destination Addresses to Decide which Side of the CAM to Program IP Addresses:

In a first embodiment of a CAM programming scheme, a particular bit, e.g., the $28^{th}$ bit, of an IP destination address of a packet 201 is examined to determine which of a plurality of sections of the CAM 210 should be programmed with that IP destination address. For example, using the left and right side partitioning terminology that is discussed above, such a programming scheme can determine whether to program the IP destination address in the left side bits or right side bits of the CAM 210. Using this technique, addresses to program into left side of the CAM 210 (since the $28^{th}$ bit is 0) include:

10.0.0.0/8
10.10.0.0/16

That is, in this particular embodiment, the $28^{th}$ bit of the IP destination address is examined to determine whether that bit is a 1 or a 0. A 0 is associated with the left side of the CAM 210, while a 1 is associated with the right side of the CAM 210. According to the information laid out above, both of these IP destination address have a 0 at the $28^{th}$ bit, and therefore, these addresses are both programmed into the left side of the CAM 210.

It is noted that the first 8 bits (the $31^{st}$ through the $24^{th}$ bits) for these two IP destination addresses in the "10" network are the same (i.e., 00001010). It is also noted that the address 10.0.0.0/8 is a super-net route of 10.10.10.0/16. Since these addresses are programmed on the same side of the CAM 210, an embodiment is able to preserve a parent-child relationship between these IP destination addresses by programming at different CAM levels (rows) with different priority in the left side. In an embodiment, a particular priority is assigned to a matching IP destination address with the larger prefix (e.g., 10.10.0.0/16), as opposed to another matching IP destination address with a smaller prefix (e.g., 10.0.0.0/8) in the parent child relationship.

For example in the super-netting scheme of the Classless Inter-Domain Routing (CIDR) model, the address 10.10.0.0/16 belongs to (is a child of) the parent address 10.0.0.0/8. Therefore, if a packet with a destination address 10.20.1.1 is received, this particular address can be matched to and is included in the range of addresses corresponding to the CAM entry 10.0.0.0/8. In comparison, if a packet with a destination address of 10.10.2.1 is received, this particular address is included in the range of addresses of both CAM entries 10.0.0.0/8 and 10.10.0.0/16. An embodiment matches this particular destination address with the CAM entry having the larger prefix (10.10.0.0/16) so as to obtain a closer address match.

Continuing with this example of examining the $28^{th}$ bit, the IP destination addresses to be programmed into right side of the CAM 210 (since the $28^{th}$ bit is 1) include:

20.10.0.0/16
16.0.0.0/8
28.10.10.0/24

In the above-described embodiments, the fourth MSB (the $28^{th}$ bit) was examined to determine whether the particular IP destination address is to be programmed into the left or right side of the CAM 210. The $28^{th}$ bit was selected since selection of this bit will divide addresses in each class into equal halves, and so addresses from each half can be equally distributed on both sides of the CAM 210. Theoretically, therefore, selection of the $28^{th}$ bit as the criteria should provide a good distribution of routes on each side of the CAM 210 for at least the following classes:

| | |
|---|---|
| Class A: 0 | (at $31^{st}$ bit) |
| Class B: 10 | (at $31^{st}$ and $30^{th}$ bits) |
| Class C: 110 | (at $31^{st}$ through $29^{th}$ bits) |
| Class D: 111 | (at $31^{st}$ through $29^{th}$ bits) |

In an embodiment, certain IP destination addresses that have bit(s) that do not fit the characteristics used in the $28^{th}$ bit selection criteria are programmed on both sides of the CAM 210. Programming on both sides of the CAM 210 provides a measure of insurance that a match will be found in the CAM 210 if or when a packet 201 is received having one of these non-characteristic addresses. For example for the above-described embodiments that examine the $28^{th}$ bit, all the routes that have a prefix length $\leq 3$ (i.e., addresses that fall within the address range specified by only the $31^{st}$ through $29^{th}$ bits) can be programmed on both sides of the CAM 210, such that children with fourth MSB=1 (i.e., the $28^{th}$ bit=1) are on the right side and children with fourth MSB=0 (i.e., the $28^{th}$ bit=0) are on the left side of the CAM 210. This arrangement preserves the super-net route's child and parent relationship in the CAM 210.

In practice, the number of such routes with prefix length $\leq 3$ is limited to about six addresses, and hence only six entries need to be programmed in both the left and right sides of the CAM 210. Hence, the CAM 210 is not unduly overloaded with duplicative entries. In most network situations, there are usually routes having prefix lengths of 8 and higher.

2. Using an Exclusive Or (XOR) Result of the $26^{th}$ and $27^{th}$ Bits to Decide which Side of the CAM to Program IP Addresses:

Based on a statistical analysis of Internet routes, the XOR result of the $26^{th}$ and $27^{th}$ bits of the IP destination addresses divides the routes into equal halves for the CAM 210. Thus, an embodiment of this CAM programming performs an XOR operation to populate the CAM 210 with address entries and to double the number of CAM entries.

Referring back to the five example IP destination addresses listed above, performing an XOR operation on the $26^{th}$ and $27^{th}$ bits yields the following results.

Addresses to program into left side of CAM 210 (since XOR result bit is 0):

16.0.0.0/8
28.10.10.0/24

Addresses to program into right side of CAM 210 (since XOR result bit is 1):

10.0.0.0/8
10.10.0.0/16
20.10.0.0/16

It is noted that the groupings based on the XOR operation also preserve the parent-child relationship between the "10" network routes, as demonstrated above. In an embodiment, certain IP destination addresses that have bit(s) that do not fit the characteristics used in the XOR selection criteria are programmed on both sides of the CAM 210. Programming on both sides of the CAM 210 provides a measure of insurance that a match will be found in the CAM 210 if or when a packet 201 is received having one of these non-characteristic addresses. In an embodiment, both sides of the CAM 210 can be programmed similarly as described above for the $28^{th}$ bit selection criteria for the non-characteristic addresses.

3. Using a Decision Table to Decide which on Side of the CAM to Program IP Addresses:

In this scheme, a decision table based on plurality of the MSB bits of an IP destination address is used to decide on which side of the CAM 210 the IP destination address is to be programmed. An exemplary decision table is provided below, which is based on the $28^{th}$, $27^{th}$, and $26^{th}$ bits of the IP destination address.

| $28^{th}$ | $27^{th}$ | $26^{th}$ | Result |
|---|---|---|---|
| 0 | 0 | 0 | 1 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

For example, assuming that under the decision table's column labeled "Result" above, the right side of the CAM=1 and the left side of the CAM=0, the five exemplary IP destination addressed provided above may be programmed as follows:

Addresses to program into left side of CAM 210 (since Result=1):

10.0.0.0/8
10.10.0.0/16
16.0.0.0/8

Addresses to program into right side of CAM 210 (since Result=0):

20.10.0.0/16
28.0.0.0/8

The above groupings can be made by examining the $28^{th}$ through the $26^{th}$ bits of each IP destination addresses, and then trying to locate a decision table entry (row) that matches the bit pattern. The particular matching row specifies the side of the CAM 210 to program that address, under the column heading "Results."

According to one embodiment, software (running on a processor) can program the route (e.g., the next hop IP address and/or the PRAM index that identifies a location in the memory 216 that stores the next hop IP address) in the CAM 210 based on the decision table. Whether to designate the "Results" of any particular bit pattern combination as a 1 or as a 0 can be based on a number of factors. Such factors include but are not limited to user preference, statistical distribution of addresses to ensure substantially equal population of both halves of the CAM 210, least or most commonly accessed addresses, specific network configurations (e.g., availability or unavailability of certain routes in particular networks), or other factors Using selected MSB bit(s) of the IP destination address, as part of the decision table (e.g., the $28^{th}$ through the $26^{th}$ bits as in the above example) allows one to program IP routes into the CAM 210 without violating the super-netting relationship of routes. The MSB bits of one example embodiment is chosen such that routes (e.g., b) are statistically divided into two substantially equal groups, so that the left and right side memory locations of the CAM 210 can be efficiently utilized.

In case there are IP addresses having prefix lengths smaller than the least MSB (e.g., the $26^{th}$ bit in the example above) used in the decision process, then those IP addresses can be programmed on both sides of the CAM 210 to ensure that a match is found when a packet is received having that particular IP destination address. For example for the above-specified decision table, IP addresses with prefix lengths smaller or equal to 5 can be programmed on both sides of the CAM 210.

It is noted that the decision table can contain section numbers (0, 1, 2, 3, etc., for example) depending on the number of partitions that have been made in the decision table.

In a routing operation after the CAM 210 has been programmed, when a packet 201 is received, the $28^{th}$ through the $26^{th}$ bits of its IP destination address are examined (using hardware in an embodiment) and compared to entries in the decision table to find the appropriate CAM side. Based on the CAM side thus identified with the matching bit pattern, the hardware then performs a CAM lookup using an appropriate mask (e.g., the left or right side of the CAM 210) to identify a location in memory (e.g., the memory 216) that contains the address of the next hop. This process thus avoids having to perform a second lookup in the CAM 210, as with current techniques.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, various examples above have been described with reference to specific network addresses, message syntax, address formats, and so forth. It is appreciated that these are merely examples and that embodiments can be implemented with any type of suitable syntax or format. Moreover, embodiments can be provided for networks that do not necessarily use the addressing formats discussed herein. For example, there may be networks that use network addressing formats that are different than that of CIDR or IPv4. In such networks, embodiments can be provided that perform address programming into memory, as well as identifying network addresses in the routing path, based on the behavior or characteristics of one or more bits of an address associated with the received packet. Such an address need not necessarily be a destination address, and can, for instance, include a source network address alternatively or additionally to a destination network address. Furthermore in such embodiments, the $28^{th}$ bit and/or the particular MSB bits need not necessarily comprise the bits that are examined. The determination of which specific bit(s) to examine can be based on the type of behavior or characteristics of the network addresses that are implemented in the particular network, using non-limiting factors such as the bit(s) that can be used to distinguish between network addresses, substantially equal distribution of network addresses in a CAM, and so forth.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed:

1. A system comprising:
    a memory comprising a first portion and a second portion; and
    a lookup handler configured to:
        determine a value based upon one or more bits of a packet;
        select, based upon the determined value, one of the first portion and the second portion to be used for the packet; and
        cause the selected portion of the memory to be accessed for processing the packet.

2. The system of claim 1 wherein the one or more bits are from a network address included in the packet.

3. The system of claim 2 wherein the lookup handler is configured to determine the value based upon $26^{th}$ and $27^{th}$ bits of the network address.

4. The system of claim 2 wherein the lookup handler is configured to determine the value based upon $28^{th}$, $27^{th}$, and $26^{th}$ bits of the network address.

5. The system of claim 2 wherein the lookup handler is configured to determine the value based upon $28^{th}$ bit of the network address.

6. The system of claim 2 wherein the network address is a destination address of the packet.

7. The system of claim 1 wherein:
    the one or more bits comprise a plurality of bits; and
    the lookup handler is configured to determine the value by performing an operation on the plurality of bits.

8. The system of claim 7 wherein the operation is an exclusive OR (XOR) operation.

9. The system of claim 1 wherein the lookup handler is configured to:
    use the value to determine data stored in a decision table; and
    use the data from the decision table to select one of the first portion and the second portion.

10. The system of claim 1 wherein the memory is an N-bit memory and the first portion corresponds to upper N/2 bits portion of the memory and the second portion corresponds to lower N/2 bits portion of the memory.

11. The system of claim 1 wherein the memory is a content addressable memory (CAM).

12. The system of claim 1 further comprising a forwarding component configured to forward the packet using information obtained from accessing the selected portion of the memory.

13. A method comprising:
    determining, by a network device, a value based upon one or more bits of a packet received by the network device;
    selecting, based upon the determined value, one of a first portion and a second portion of a memory in the network device to be used for the packet; and
    causing the selected portion of the memory determined to be accessed for processing the packet.

14. The method of claim 13 wherein the one or more bits are from a network address included in the packet.

15. The method of claim 14 wherein determining the value comprises determining the value using $26^{th}$ and $27^{th}$ bits of the network address.

16. The method of claim 14 wherein determining the value comprises determining the value using $28^{th}$, $27^{th}$, and $26^{th}$ bits of the network address.

17. The method of claim 14 wherein determining the value comprises determining the value using the $28^{th}$ bit of the network address.

18. The method of claim 14 wherein the network address is a destination address of the packet.

19. The method of claim 13 wherein:
    the one or more bits comprise a plurality of bits; and
    determining the value comprises determining the value by performing an operation on the plurality of bits.

20. The method of claim 19 wherein the operation is an exclusive OR (XOR) operation.

21. The method of claim 13 wherein selecting one of the first portion and the second portion comprises:
    using the value to determine data stored in a decision table; and
    using the data from the decision table to select one of the first portion and the second portion.

22. The method of claim 13 wherein the memory is an N-bit memory and the first portion corresponds to upper N/2 bits portion of the memory and the second portion corresponds to lower N/2 bits portion of the memory.

23. The method of claim 13 wherein the memory is a content addressable memory (CAM).

24. The method of claim 13 further comprising forwarding the packet using forwarding information obtained from accessing the selected portion of the memory.

25. A network device comprising:
    a content-addressable memory (CAM) comprising a first side and a second side; and
    one or more components configured to:
        determine whether to use the first side or the second side based upon contents of a packet received by the network device;
        obtain forwarding information for the packet using the side of the CAM determined to be used; and
        forward the packet using the forwarding information.

* * * * *